(12) United States Patent
Nagahara

(10) Patent No.: US 7,889,431 B2
(45) Date of Patent: Feb. 15, 2011

(54) PROJECTION ZOOM LENS AND PROJECTION-TYPE DISPLAY APPARATUS

(75) Inventor: Akiko Nagahara, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 0 days.

(21) Appl. No.: 12/647,238

(22) Filed: Dec. 24, 2009

(65) Prior Publication Data

US 2010/0165477 A1 Jul. 1, 2010

(30) Foreign Application Priority Data

Dec. 26, 2008 (JP) ............................ P2008-333111

(51) Int. Cl.
*G02B 9/00* (2006.01)
*G02B 9/62* (2006.01)
(52) U.S. Cl. ...................... 359/649; 359/761
(58) Field of Classification Search .................. 359/649, 359/761
See application file for complete search history.

(56) References Cited

U.S. PATENT DOCUMENTS 7,715,111 B2 * 5/2010 Yamamoto et al. .......... 359/684

| | | |
|---|---|---|
| 2008/0074756 A1 | 3/2008 | Yamamoto |
| 2008/0231962 A1 | 9/2008 | Yamada |
| 2009/0135496 A1 | 5/2009 | Nagahara et al. |
| 2009/0135497 A1 | 5/2009 | Nagahara et al. |

FOREIGN PATENT DOCUMENTS

| | | |
|---|---|---|
| JP | 8-201690 | 8/1996 |
| JP | 2002-122782 | 4/2002 |
| JP | 2008-46259 | 2/2008 |
| JP | 2008-83229 | 4/2008 |
| JP | 2009-128683 | 6/2009 |
| JP | 2009-128684 | 6/2009 |

* cited by examiner

*Primary Examiner*—William C Choi
(74) *Attorney, Agent, or Firm*—Birch, Stewart, Kolasch & Birch, LLP

(57) ABSTRACT

A zoom lens includes, in order from a magnification side, a negative first lens group for focus adjustment adapted to be fixed during power-varying, a positive second lens group adapted to move during power-varying, a negative third lens group, a positive fourth lens group, and a positive fifth lens group, and a positive sixth lens group adapted to be fixed during power-varying, the sixth lens group having a stop arranged nearest to the magnification side. Each lens is a single lens. A ratio of a back focal length of the entire system to a focal length at a wide-angle end of the entire system is larger than 2.5, and Fno. is set constant over the whole region of power-varying.

11 Claims, 25 Drawing Sheets

EXAMPLE 1 (WIDE)

FIG. 5  EXAMPLE 3 (WIDE)

FIG. 7 EXAMPLE 4 (WIDE)

EXAMPLE 4

FIG. 9 EXAMPLE 5 (WIDE)

FIG. 13 EXAMPLE 7 (WIDE)

FIG. 16
EXAMPLE 8
WIDE
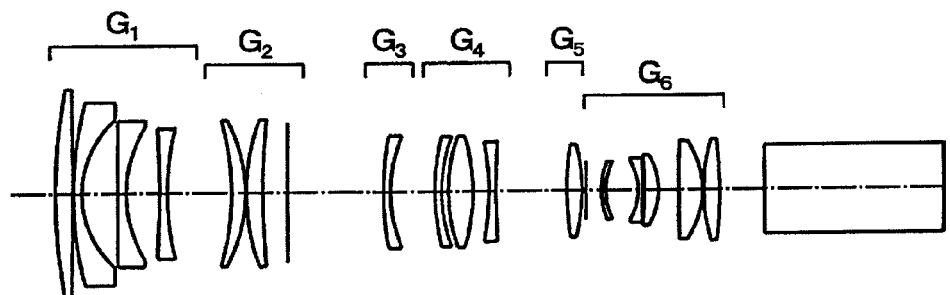
MIDDLE
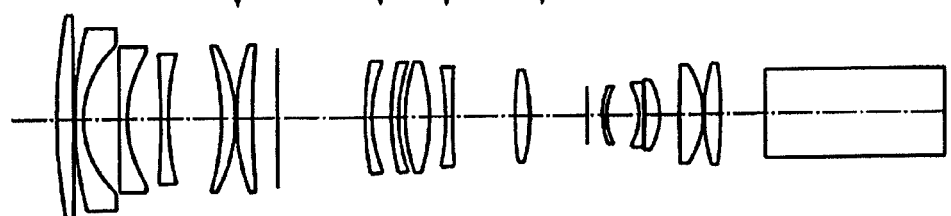
TELE
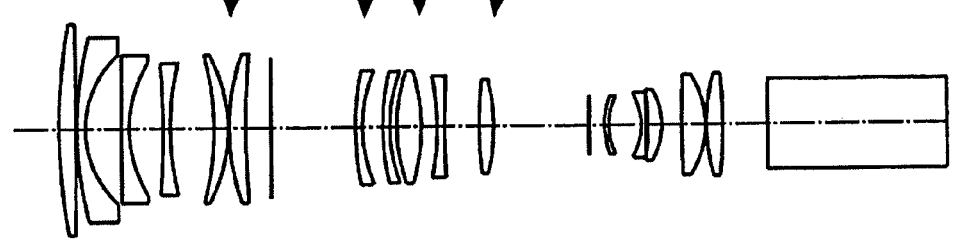

FIG. 17
EXAMPLE 1
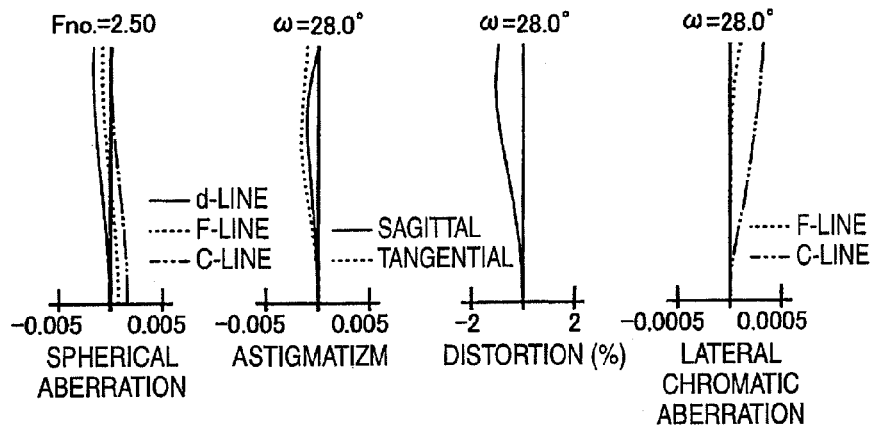
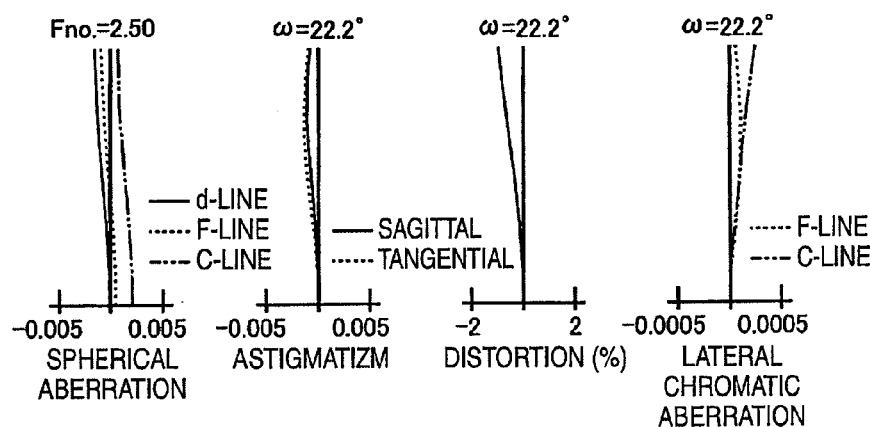
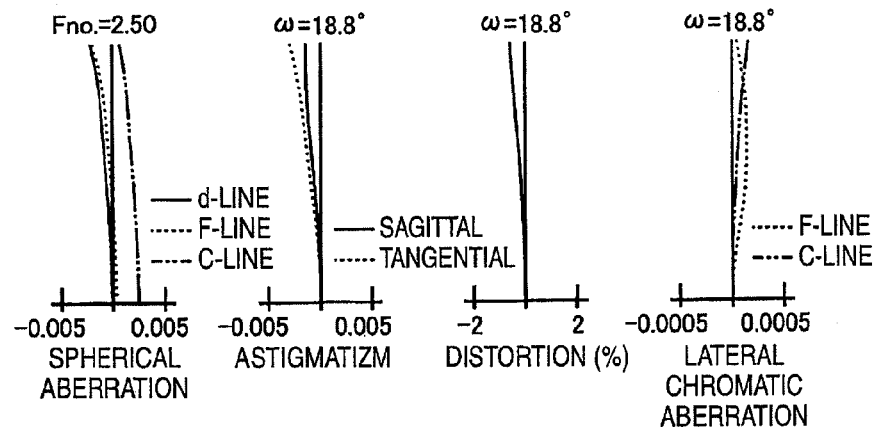

FIG. 18
EXAMPLE 2
WIDE
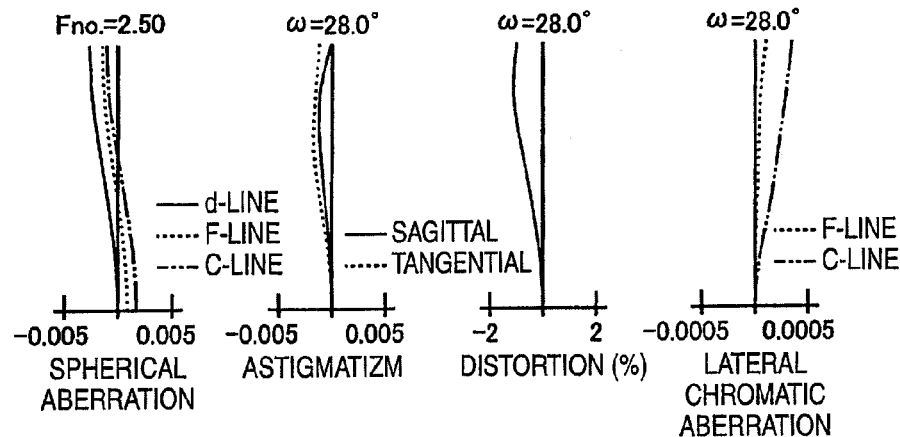
MIDDLE
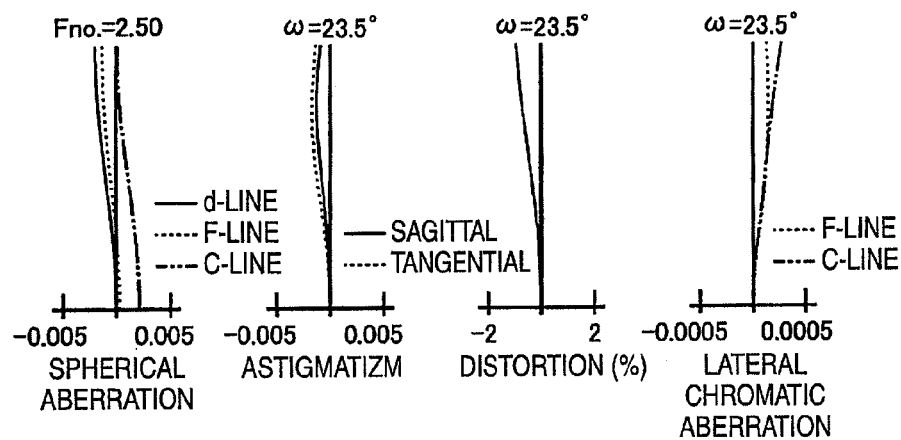
TELE
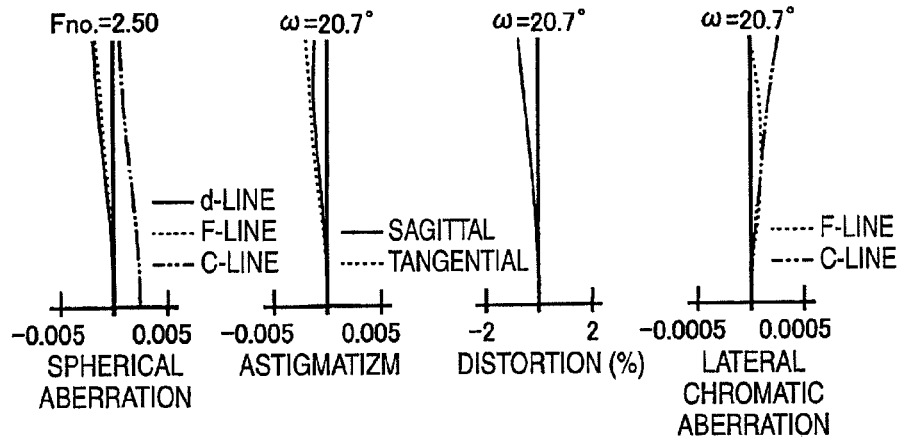

FIG. 19
EXAMPLE 3
WIDE
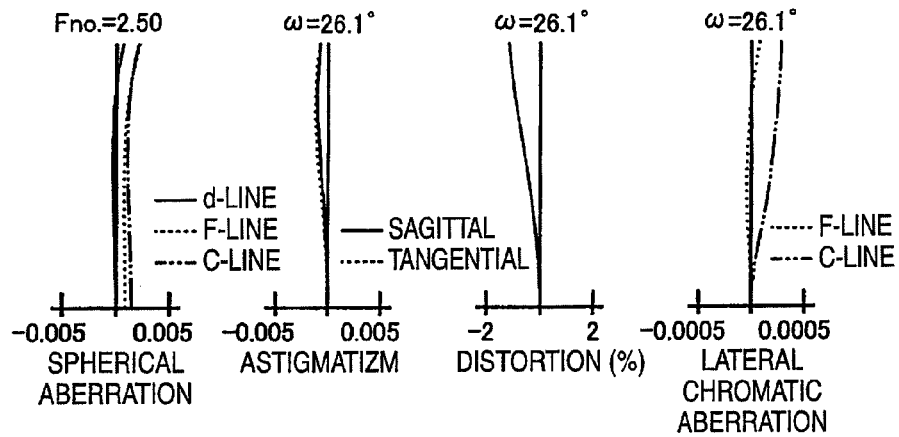
MIDDLE
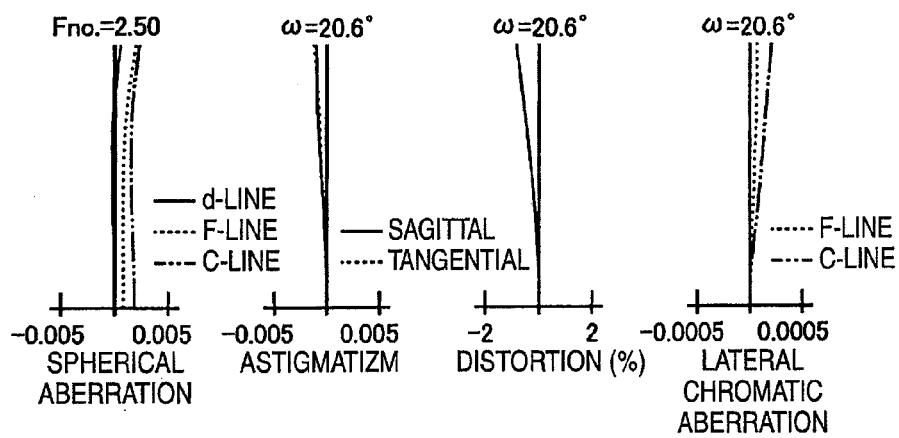
TELE
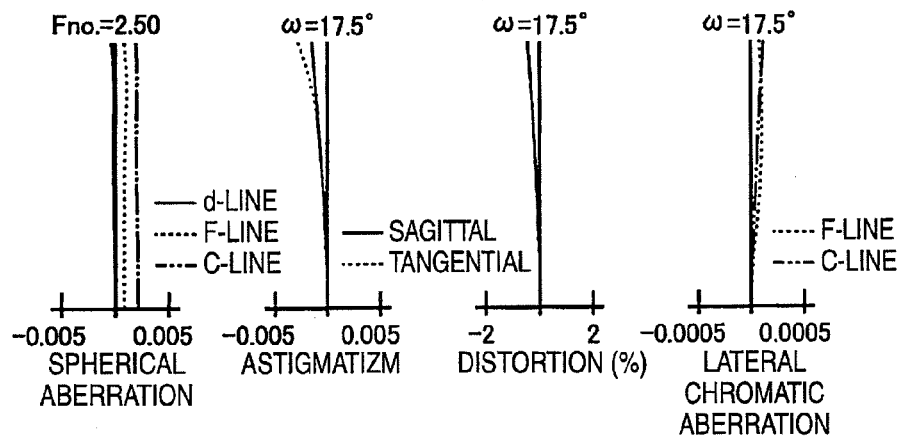

FIG. 20
EXAMPLE 4
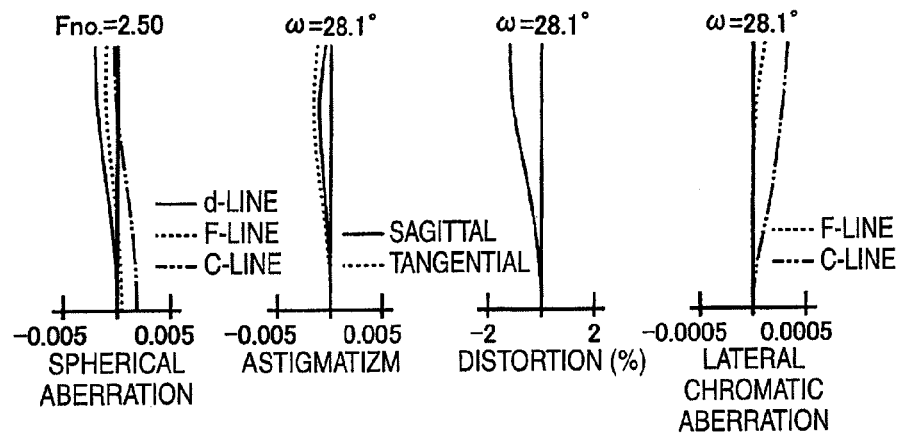
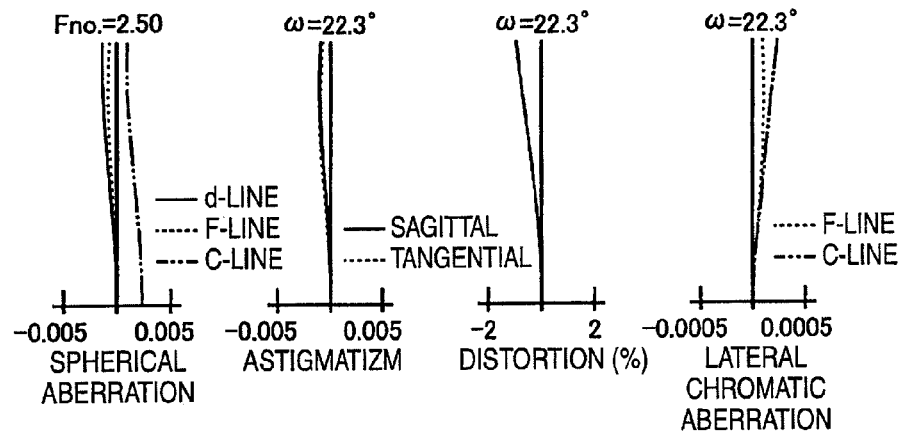
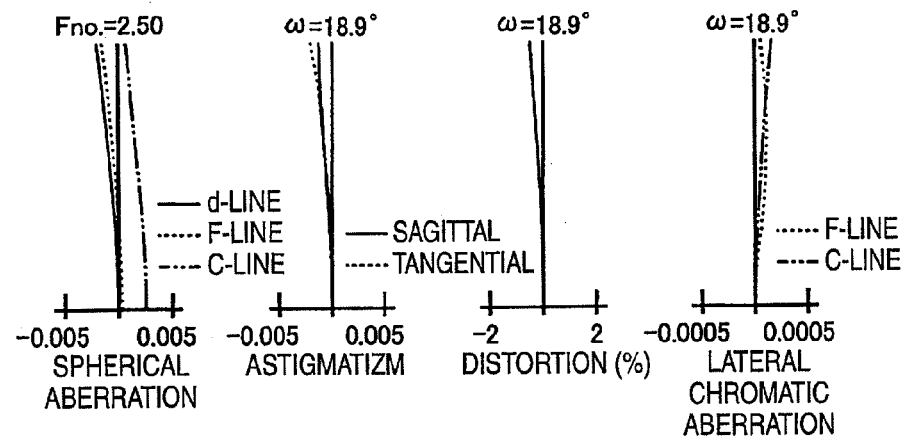

FIG. 21
EXAMPLE 5
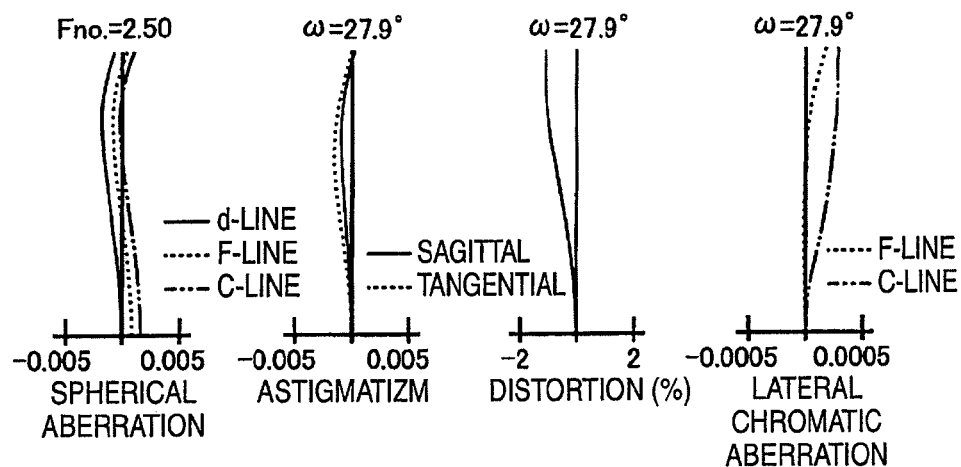
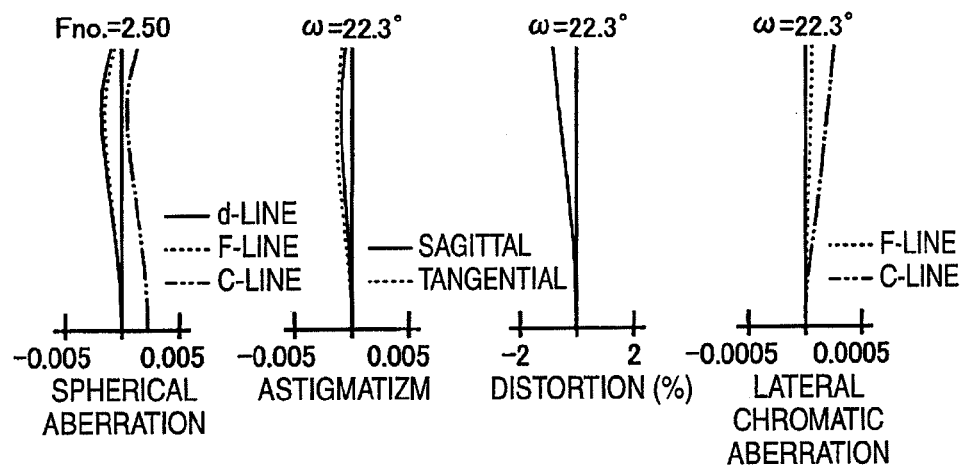
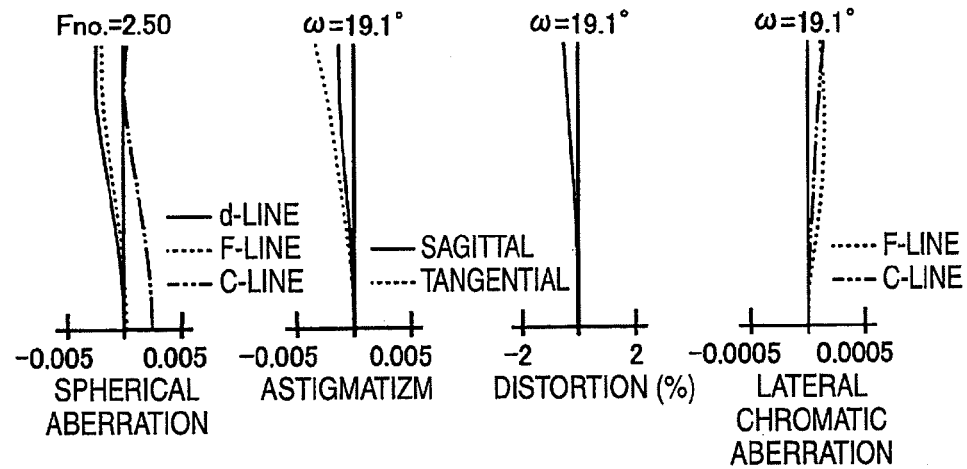

FIG. 22 EXAMPLE 6

FIG. 23
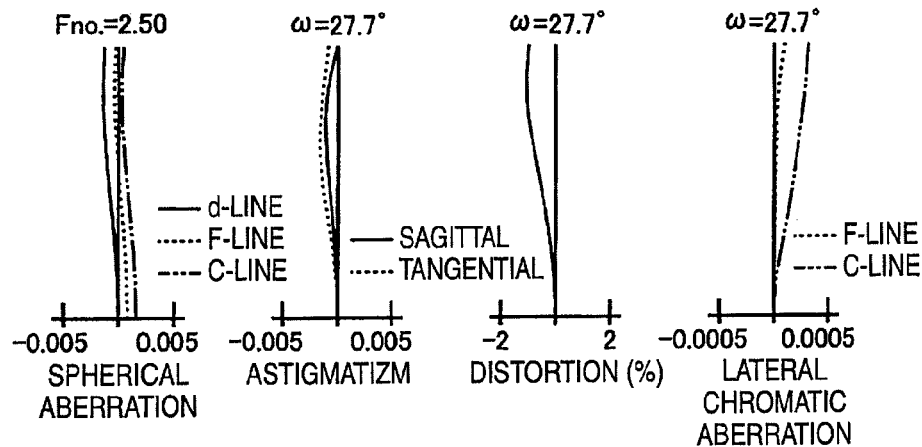
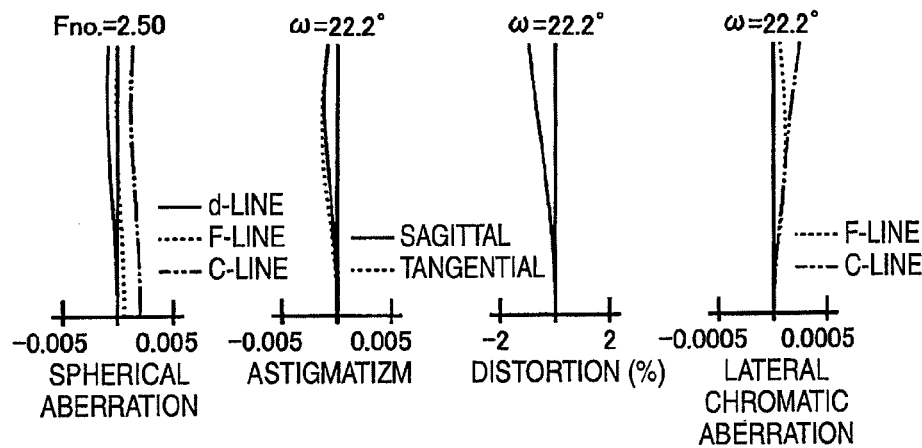
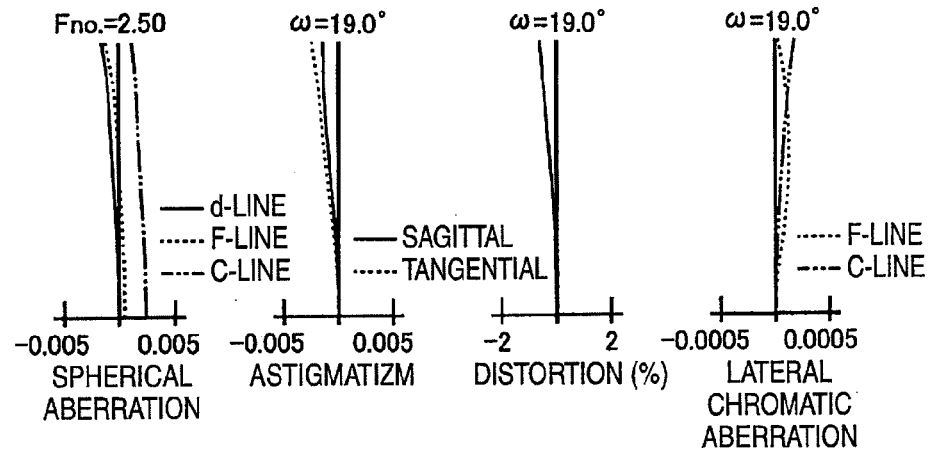

FIG. 24
EXAMPLE 8
WIDE
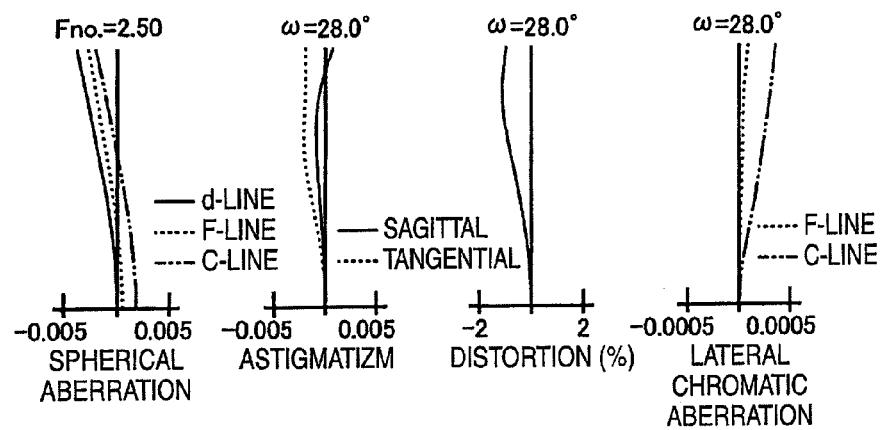
MIDDLE
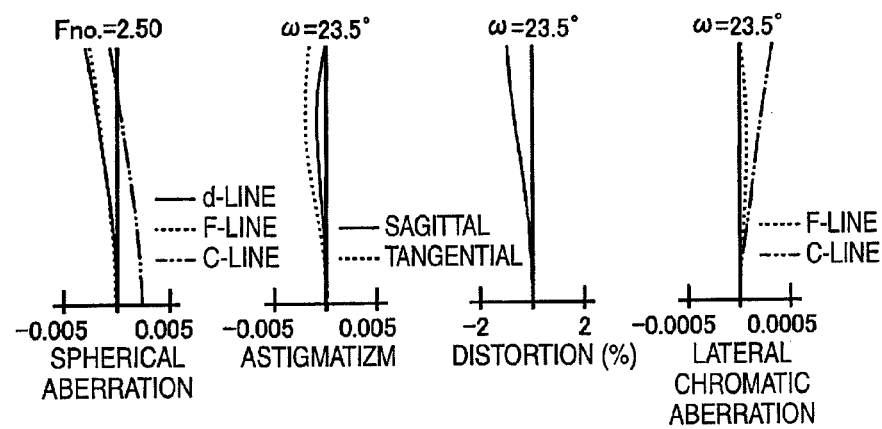
TELE
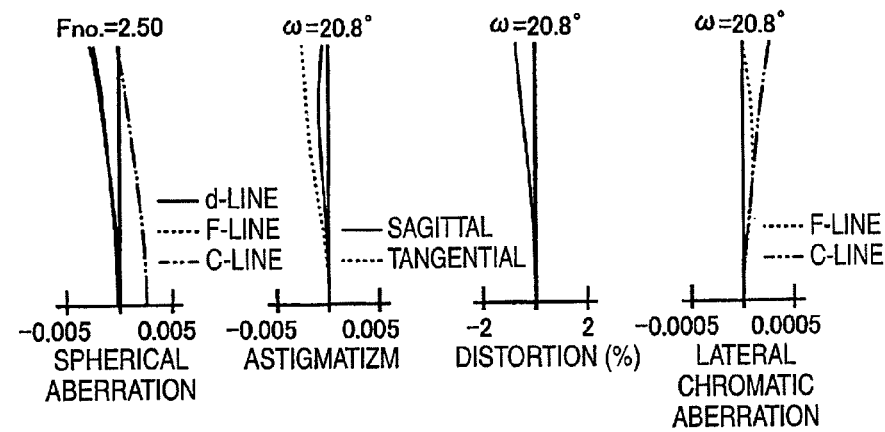

ent 2 (JP-A-2002-122782). The lens described in Patent Document 2 is a varifocal lens, so telecentricity is not maintained constant during power-varying and operation adjustment becomes complicated when power-varying is necessary after installation.
PROJECTION ZOOM LENS AND PROJECTION-TYPE DISPLAY APPARATUS

CROSS-REFERENCE TO RELATED APPLICATIONS

This application is based on and claims priority under 35 USC 119 from Japanese Patent Application No. 2008-333111 filed on Dec. 26, 2008.

BACKGROUND

1. Technical Field

The present invention relates to a projection zoom lens of a six-group configuration and four-group movement mounted on a projection-type display device or the like, and a projection-type display device having the projection zoom lens mounted thereon. In particular, the present invention relates to a projection zoom lens and a projection-type display device suitable for projecting on a large screen in a movie theater or the like.

2. Related Art

A projector device (projection-type display device) which uses a light valve of a liquid crystal display or a DMD display and has a comparatively long back focal length has come into wide use (see Patent Document 1 (JP-A-8-201690)).

In recent years, a projector that can be applied to a large screen and can project a high-definition image has been used as such a projector device in the movie theater.

A reflective liquid crystal display element or a DMD 3-sheet type is used for the projector device provided for such a use, and a longer back focal length and telecentricity as satisfactory as other projectors are required.

Generally, a value obtained by dividing a projection distance by a screen width is referred to as a throw ratio. The screen size and the distance from the screen to the projection room, that is, the projection distance are various according to movie theaters. Accordingly, in order to project a picture with a proper size for each movie theater, a lens corresponding to each proper throw ratio is necessary, but in consideration of cost it is not a good method to actually prepare all lenses corresponding to proper throw ratios. Thus, this can be addressed by providing a width that can correspond to the throw ratio using a zoom lens.

However, in most of the related-art lenses for projectors, a numerical aperture (hereinafter, also referred to as "Fno.") is changed during zooming. Generally, the related-art lens for a projector has a slower speed of Fno. on a TELE side than that on a WIDE side. Accordingly, in such a zoom lens, a picture of a movie theater with a high throw ratio gets dark even in movie theaters having the same screen size.

As the zoom ratio of a lens gets higher, the versatility of the lens gets higher. However, in the related-art lens for a projector, as the zoom ratio gets higher, a variable of Fno. gets larger. Accordingly, the lens is not suitable for a movie theater.

To address that the lens is not suitable for a movie theater since Fno. is changed according to a change in the zoom ratio, there has been proposed a lens described in Patent Document 2 (JP-A-2002-122782). The lens described in Patent Document 2 is a varifocal lens, so telecentricity is not maintained constant during power-varying and operation adjustment becomes complicated when power-varying is necessary after installation.

In consideration of such situations, the applicant has proposed a projection zoom lens having a proper back focal length, constant Fno. during zooming, a high zoom ratio and high compatibility, and has submitted to the Japanese Patent Office (see Patent Document 3 (JP-A-2009-128683 corresponding to US-A-2009/0135496) and Patent Document 4 (JP-A-2009-128684 corresponding to US-A-2009/0135497)).

The projection zoom lens according to the invention described in Patent Document 3 (hereinafter, referred to as "Proposed Invention 3") is of a five-group configuration and three-group movement. In this projection zoom lens, an aperture adapted to be fixed during power-varying is arranged between the fourth lens group and the fifth lens group.

The projection zoom lens according to the invention described in Patent Document 4 (hereinafter, referred to as "Proposed Invention 4") is of a six-group configuration and four-group movement. In this projection zoom lens, an aperture that is independently moved during power-varying is arranged between the fourth lens group and the fifth lens group.

The zoom lens of Proposed Invention 4 can further increase an angle of view, as compared with the zoom lens of Proposed Invention 3. However, in the zoom lens of Proposed Invention 4, moving groups are arranged on the reduction side. Accordingly, by comparison of the outer diameter of a lens including a mechanism, the outer diameter of a lens on the reduction side in the zoom lens of Proposed Invention 4 becomes larger.

In general, the outer-diameter portion of a lens includes a fastening mechanism for fastening the lens to the projection-type display device. However, when a lens is fastened to an existing cinema-oriented projection-type display device, in many cases, the fastening mechanism is provided on the reduction side from the position of an aperture diaphragm (in the zoom lens of Proposed Invention 4, the position of an aperture diaphragm at a WIDE end).

In an existing projection-type display device, the size of a space for arranging a projection lens is set in advance. Accordingly, in order to mount a proposed new projection lens on an existing device, the outer diameter of a lens on the reduction side from a position where the fastening mechanism is arranged needs to have such a size as to be accommodated in the space for lens arrangement of the device.

However, the zoom lens of Proposed Invention 4 is configured such that the outer diameter of a lens on the reduction side from a position where the fastening mechanism is arranged becomes larger, as compared with the zoom lens of Proposed Invention 3. For this reason, the zoom lens may not be attached to an existing projection-type display device to which the zoom lens of Proposed Invention 3 can be attached.

SUMMARY

An object of the invention is to provide a telecentric projection zoom lens that has a proper back focal length, is easy to increase the angle of view, has constant Fno. during zooming and a high zoom ratio in a state where the angle of view is increased, and has high compatibility such that the outer diameter of a lens on a reduction side from a position where a fastening mechanism is arranged can be reduced, and a projection-type display device using the projection zoom lens.

An aspect of the invention provides a projection zoom lens. The projection zoom lens includes, in order from a magnification side, a first lens group having negative refractive power adapted to perform focusing with being fixed during power-varying, a second lens group having positive refractive power adapted to move during power-varying, a third lens group having negative refractive power adapted to move during power-varying, a fourth lens group having positive refractive power adapted to move during power-varying, a fifth lens group having a positive refractive power adapted to move during power-varying, and a sixth lens group having positive refractive power adapted to be fixed during power-varying and to include a stop nearest to the magnification side. A numerical aperture is set constant over the whole region of power-varying. Each lens is a single lens. A reduction side is made telecentric. The following conditional expression (1) is satisfied:

$$2.5 < Bf/f \qquad (1)$$

where Bf denotes an air-converted distance back focal length of the entire system, and f denotes a focal length at a wide-angle end of the entire system.

The "stop" of the sixth lens group may include a variable diaphragm having a variable diameter, in addition to a so-called fixed aperture having a fixed diameter.

In the projection zoom lens according to the aspect of the invention, the second lens group may be configured such that a lens nearest to the magnification side is a positive meniscus lens having a concave surface directed toward the magnification side, and a lens nearest to a reduction side is a positive lens where a surface thereof on the magnification side is a convex surface having a curvature larger than that of a surface thereof on the reduction side. The following conditional expression (2) may be satisfied:

$$3.5 < f2/f < 4.2 \qquad (2)$$

where f2 denotes a focal length of the second lens group.

all lenses in the second lens group may be positive lenses.

The second lens group may have a stop nearest to the reduction side of the second lens group.

The fifth lens group may consist of one biconvex lens, and the following conditional expression (3) may be satisfied:

$$70 < vd_{G5} \qquad (3)$$

where $vd_{G5}$ denotes an Abbe number of the biconvex lens in the fifth lens group at the d-line.

The sixth lens group may include, in order from the magnification side, a negative meniscus lens having a convex surface directed toward the magnification side, a negative lens having a concave surface directed toward the magnification side, a positive lens having a convex surface directed toward the reduction side, and at least one positive lens. The following conditional expression (4) may be satisfied:

$$65 < vd_{G6p} \qquad (4)$$

where $vd_{G6p}$ denotes an Abbe number of each positive lens in the sixth lens group at the d-line.

The following conditional expressions (5) and (6) may be satisfied:

$$45 < vd_{G6n} \qquad (5)$$

$$1.8 < Nd_{G6n} \qquad (6)$$

where $vd_{G6n}$ denotes an Abbe number of the negative lens having the concave surface directed toward the magnification side in the sixth lens group at the d-line, and $Nd_{G6n}$ denotes a refractive index of the negative lens with the concave surface on the magnification side in the sixth lens group at the d-line.

The following conditional expression (7) may be satisfied:

$$2.5 < f6/f < 3.0 \qquad (7)$$

where f6 denotes a focal length of the sixth lens group.

The following conditional expression (8) may be satisfied:

$$2.1 < D_{G6}/f < 2.6 \qquad (8)$$

where $D_{G6}$ denotes a distance from the stop of the sixth lens group to a lens surface of the sixth lens group nearest to the reduction side.

The following conditional expression (9) may be satisfied:

$$3.3 < |f6/f6_F| < 5.0 \qquad (9)$$

where $f6_F$ denotes a distance from a lens surface of the sixth lens group nearest to a magnification-side focal point of the sixth lens group, and f6 denotes a focal length of the sixth lens group.

Another aspect of the invention provides a projection-type display device. The projection-type display device includes a light source, a light valve, and the above-described projection zoom lens serving as a projection lens projecting an optical image based on light modulated by the light valve onto a screen.

The projection zoom lens according to the aspect of the invention is a zoom lens of a six-group configuration and four-group movement, and includes, in order from the magnification side, the negative first lens group for focus adjustment adapted to be fixed during power-varying, the positive second lens group adapted to be movable during power-varying, the negative third lens group, the positive fourth lens group, the positive fifth lens group, and the positive sixth lens group adapted to be fixed during power-varying. The stop is arranged nearest to the magnification side of the sixth lens group. Each lens is a single lens. A ratio of a back focal length (air conversion distance) Bf of the entire system to a focal length f at a wide-angle end of the entire system is larger than 2.5, and Fno. is set constant over the whole region of power-varying.

With this configuration, a high zoom ratio can be maintained, it is easy to increase the angle of view of the zoom lens, and Fno. can be made substantially constant over the whole region of power-varying in a state where the angle of view is increased. Each lens is a single lens, so the zoom lens is suitably used for cinema where it is used at a high temperature with a large amount of light. The stop is arranged nearest to the magnification side of the sixth lens group which is fixed during power-varying, and moving groups are arranged on the magnification side from the stop. Thus, the outer diameter of a lens arranged on the reduction side can be reduced, and as a result, the zoom lens can be attached to an existing projection-type display device having a limited space for lens arrangement.

Therefore, with the projection zoom lens and the projection-type display device using the projection zoom lens according to the aspects of the invention, even though a projection lens only for each projection distance according to the size of the movie theater is not used, it is possible to generally cope with the situation using one projection lens in a range, and it is possible to project images having the same size onto a screen with the same brightness in any movie theater. With the above-described high zoom ratio, it is possible to project an image with an aspect ratio varied according to zooming with only the width changed while keeping a height constant.

The back focal length of the entire system is set as described above, so it is possible to secure a space suitable for inserting a glass block as a color composing unit, such as a cross dichroic prism and a TIR prism. Further, it is possible to satisfy the demand that telecentricity of the lens system on the reduction side is good.

BRIEF DESCRIPTION OF THE DRAWINGS

FIG. 16 is a diagram showing movement positions of lens groups of the projection zoom lens according to Example 8 at a wide-angle end (WIDE), a middle position (MIDDLE), and a telephoto end (TELE).

FIG. 17 is aberration diagrams of the projection zoom lens according to Example 1.

FIG. 18 is aberration diagrams of the projection zoom lens according to Example 2.

FIG. 19 is aberration diagrams of the projection zoom lens according to Example 3.

FIG. 20 is aberration diagrams of the projection zoom lens according to Example 4.

FIG. 21 is aberration diagrams of the projection zoom lens according to Example 5.

FIG. 23 is aberration diagrams of the projection zoom lens according to Example 7.

FIG. 24 is aberration diagrams of the projection zoom lens according to Example 8.

DETAILED DESCRIPTION

Figure 1:
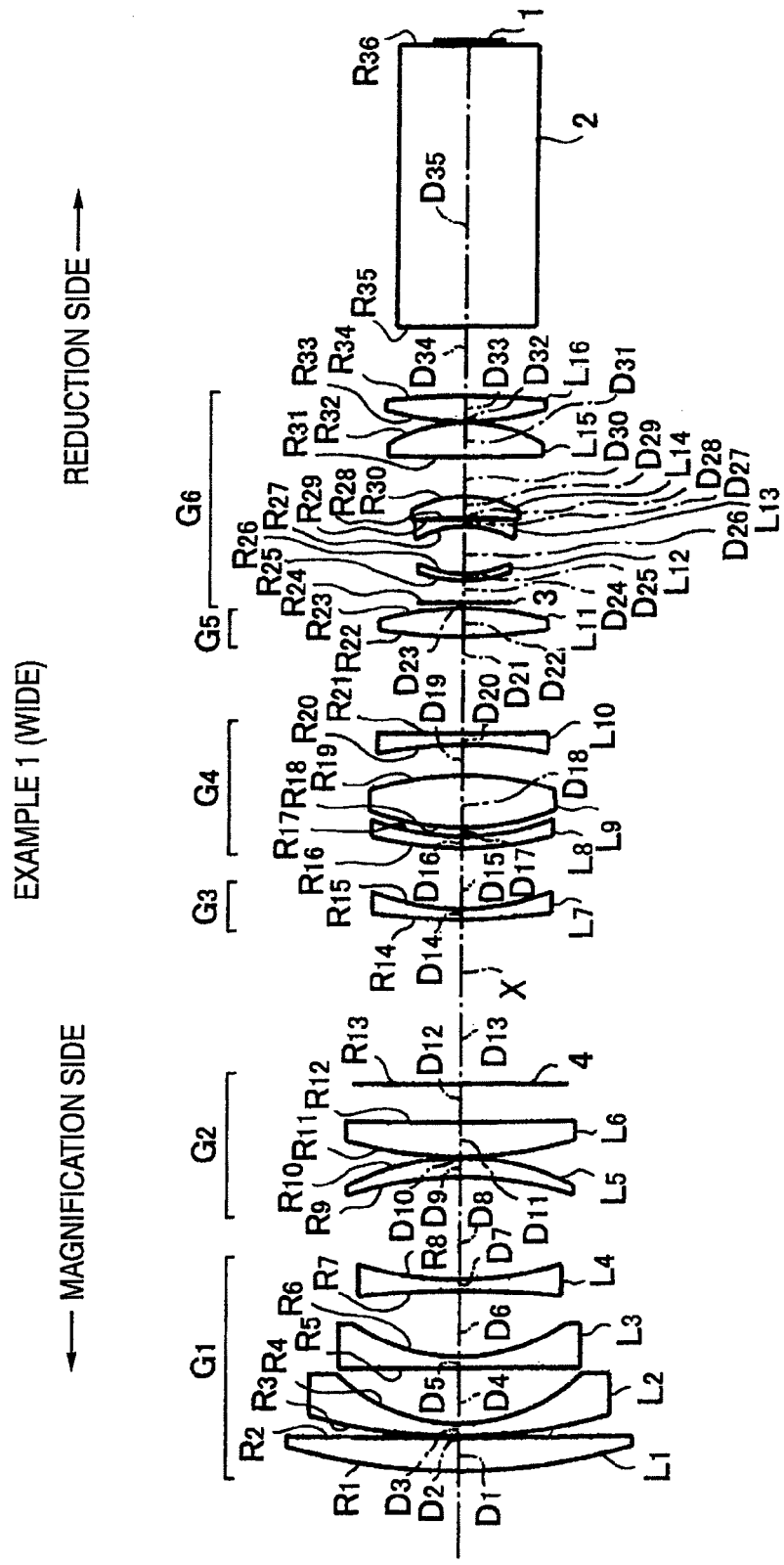
FIG. 1 is a diagram showing the lens configuration of a projection zoom lens according to Example 1.
Figure 2:
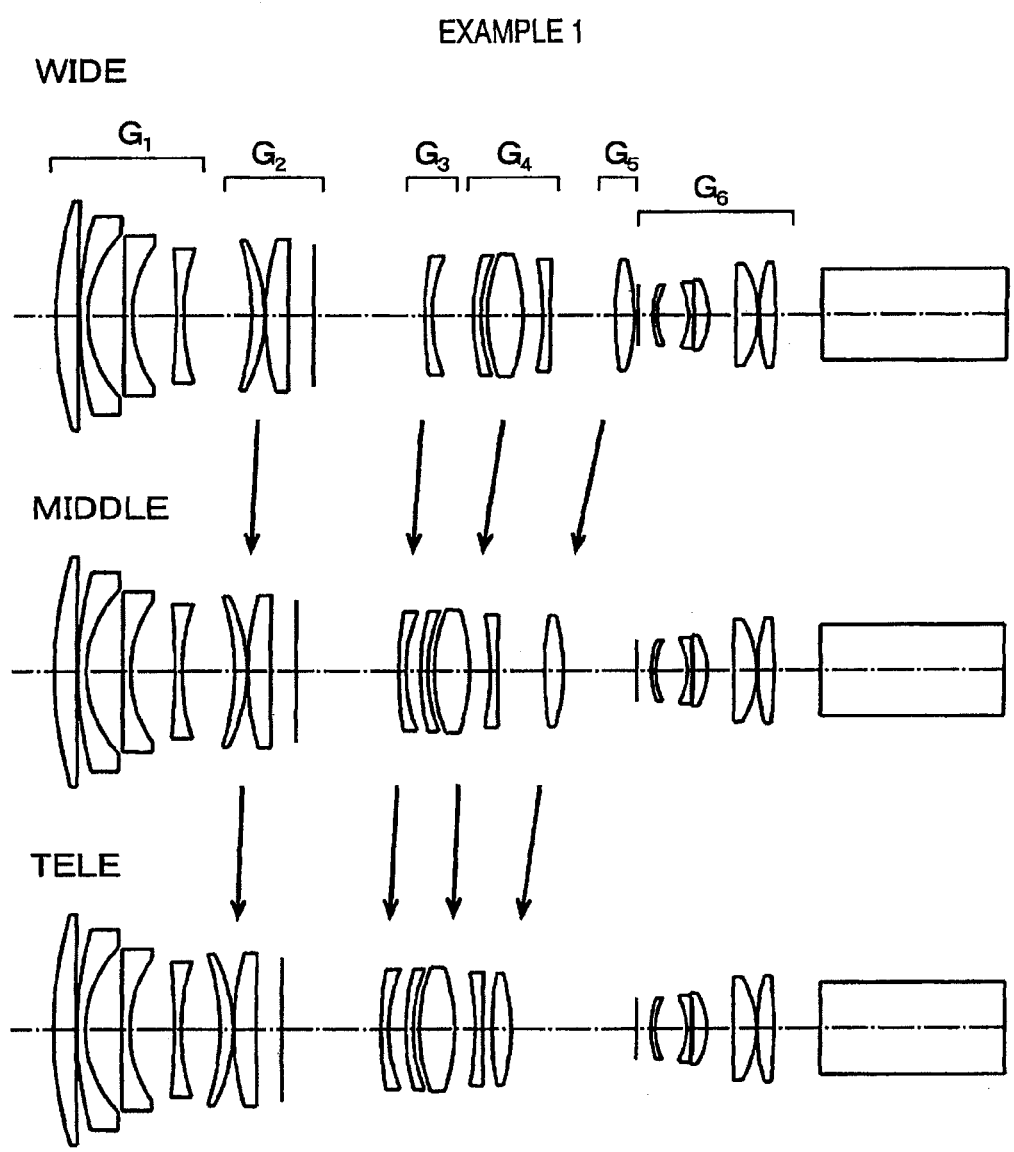
FIG. 2 is a diagram showing movement positions of lens groups of the projection zoom lens according to Example 1 at a wide-angle end (WIDE), a middle position (MIDDLE), and a telephoto end (TELE).

Hereinafter, an embodiment of the invention will be described with reference to the drawings. FIG. 1 is a diagram showing the lens configuration at a wide-angle end of a projection zoom lens according to Example 1 of the invention. FIG. 2 shows movement positions of lens groups at a wide-angle end (WIDE), a middle position (MIDDLE), and a telephoto end (TELE) according to a power-varying operation in a projection zoom lens according to Example 1. Hereinafter, this embodiment will be described with this projection zoom lens as a representative example.

This projection zoom lens is mounted on a projection-type display device which projects digital video in a movie theater or the like. The projection zoom lens includes, in order from a magnification side, a first lens group $G_1$ having negative refractive power adapted to have a focusing function with being fixed during power-varying, a second lens group $G_2$ having positive refractive power, a third lens group $G_3$ having negative refractive power, a fourth lens group $G_4$ having positive refractive power, and a fifth lens group $G_5$ having positive refractive power, which are moved in an optical axis X direction with correlation for continuous power-varying and correction of shift of an image surface caused by continuous power-varying, and a sixth lens group $G_6$ having positive refractive power adapted to be fixed during power-varying and to include an aperture diaphragm 3 nearest to the magnification side. A glass block (including a filter unit) 2 mainly having a color composing prism, and an image display surface 1 of a light valve, such as a liquid crystal display panel or the like, are arranged on the reduction side of the projection zoom lens.

The first lens group $G_1$ having a focusing function is configured to have negative refractive power, so it is easy to increase an angle of view.

The aperture diaphragm 3 functions as an aperture diaphragm, but the aperture diaphragm 3 has a simple fixed aperture and is configured such that the diameter thereof is unchanged (constant) during power-varying. Thus, brightness (Fno) of the zoom lens is maintained constant over the whole region of power-varying. Therefore, even though a projection distance is changed depending on the size or shape of the indoor space of the movie theater, the second lens group $G_2$, the third lens group $G_3$, the fourth lens group $G_4$, and the fifth lens group $G_5$ are moved in the optical axis X direction so as to perform a power-varying operation, and the first lens group $G_1$ is moved in the optical axis X direction so as to perform focusing. In this way, video with good image quality can be projected on a large screen with the same brightness. The aperture diaphragm 3 may be a variable diaphragm such that the diameter of the diaphragm can be changed.

In this projection zoom lens, the zoom ratio is preferably equal to or larger than 1.38. In this case, when a screen size having a different aspect ratio, such as vista or cinesco, is changed, it is possible to deal with maintenance of the uniform height direction of screen video by zooming, and it is possible to generally cope with various uses.

As shown in the drawing, the first lens group $G_1$ has four (in Example 4, five) single lenses (first lens $L_1$ to fourth lens $L_4$). The second lens group $G_2$ has two (in Example 4, three) single lenses (fifth lens $L_5$ and sixth lens $L_6$). The third lens group $G_3$ has one single lens (seventh lens $L_7$). The fourth lens group $G_4$ has three single lenses (eighth lens $L_8$ to tenth lens $L_{10}$). The fifth lens group $G_5$ has one single lens (eleventh lens $L_{11}$). The sixth lens group $G_6$ has five single lenses (twelfth lens $L_{12}$ to sixteenth lens $L_{16}$). The reduction side is substantially made telecentric.

As described above, in the projection zoom lens of this embodiment, no cemented lens is provided, and all lenses are single lenses. The reason is that a projection-type display device having a projection zoom lens mounted thereon is configured to output very strong light of about 2 kW using a xenon lamp or the like as a light source, unlike a device for home or small-scale meeting. That is, when a cemented lens is used, an adhesive for cementing lenses may be seriously deteriorated due to such strong light. Therefore, if all lenses are single lenses, it is possible to prevent occurrence of such a situation.

The projection zoom lens of this embodiment is configured such that the value obtained by dividing a back focal length Bf (air conversion distance) of the entire system by a focal length f at a wide-angle end of the entire system satisfies the following conditional expression (1).

$$2.5 < Bf/f \qquad (1)$$

If the back focal length of the entire system is set so as to satisfy the conditional expression (1), it is possible to secure a proper space for inserting a glass block or the like as color composing means, such as a beam splitter, a cross dichroic prism, a TIR prism, or the like.

In this projection zoom lens, the second lens group $G_2$ is preferably configured such that a lens (fifth lens $L_5$) nearest to the magnification side is a positive meniscus lens having a concave surface directed toward the magnification side, and a lens (sixth lens $L_6$) nearest to the reduction side is a positive lens where a surface thereof on the magnification side is a convex surface having a curvature larger than that of a surface thereof on the reduction side. In this case, the following conditional expression (2) is preferably satisfied.

$$3.5 < f2/f < 4.2 \qquad (2)$$

f2: a focal length of the second lens group $G_2$

As described above, the lens nearest to the reduction side in the second lens group $G_2$ is the above-described positive lens, so beams entering from the reduction side can be deflected in a direction toward the optical axis, and the diameter of a lens on the magnification side in the second lens group $G_2$ can be reduced. The lens surface nearest to the magnification side in the second lens group $G_2$ is a concave surface, such that beams exited from the second lens group $G_2$ to the magnification side can be radiated. Therefore, a burden imposed on the first lens group $G_1$ having negative refractive power can be reduced.

If the second lens group $G_2$ is configured as described above, the second lens group $G_2$ can have positive lenses only. In particular, the second lens group $G_2$ can have two positive lenses only. If the second lens group $G_2$ has two positive lenses only, the number of lenses can be reduced, and the entire system can be made compact.

An flare stop 4 made of a mask or the like is preferably arranged nearest to the reduction side in the second lens group $G_2$. If the flare stop 4 is arranged at that position, unnecessary peripheral rays in the zoom wide-angle region can be effectively cut, and satisfactory telecentricity on the reduction side can be achieved.

The fifth lens group $G_5$ preferably includes one biconvex lens satisfying the following conditional expression (3). Thus, longitudinal chromatic aberration can be satisfactorily corrected in the entire zoom region.

$$70 < vd_{G5} \qquad (3)$$

$vd_{G5}$: an Abbe number of the biconvex lens in the fifth lens group $G_5$ at the d-line The sixth lens group $G_6$ preferably includes, in order from the magnification side, a negative meniscus lens having a convex surface directed toward the magnification side, a negative lens having a concave surface directed toward the magnification side, a positive lens having a convex surface directed toward the reduction side, and at least one positive lens. In this case, the following conditional expression (4) is preferably satisfied. Thus, longitudinal chromatic aberration and lateral chromatic aberration can be satisfactorily corrected in the entire zoom region.

$$65 < vd_{G6p} \qquad (4)$$

$vd_{G6p}$: an Abbe number of each positive lens in the sixth lens group at the d-line The following conditional expressions (5) and (6) are preferably satisfied. Thus, longitudinal chromatic aberration and lateral chromatic aberration can be satisfactorily corrected in the entire zoom region.

$$45 < vd_{G6n} \qquad (5)$$

$$1.8 < Nd_{G6n} \qquad (6)$$

$vd_{G6n}$: an Abbe number of the negative lens having the concave surface directed toward the magnification side in the sixth lens group $G_6$ at the d-line $Nd_{G6n}$: a refractive index of the negative lens having the concave surface directed toward the magnification side in the sixth lens group $G_6$ at the d-line The projection zoom lens of this embodiment is preferably configured so as to satisfy the following conditional expressions (7) to (9).

$$2.5 < f6/f < 3.0 \qquad (7)$$

$$2.1 < D_{G6}/f < 2.6 \qquad (8)$$

$$3.3 < |f6/f6_F| < 5.0 \qquad (9)$$

f6: a focal length of the sixth lens group $G_6$ $D_{G6}$: a distance from the aperture diaphragm 3 of the sixth lens group $G_6$ to a lens surface nearest to the reduction side of the sixth lens group $G_6$ $f6_F$: a distance from a lens surface of the sixth lens group $G_6$ nearest to the magnification side to a magnification-side focal point of the sixth lens group $G_6$ The conditional expressions (7) to (9) are to properly set the full length or the magnitude of the diameter of the zoom lens and the back focal length while correcting aberrations in balance. If the value is larger than the upper limit of the conditional expression (7), the back focal length is excessively extended. If the value is smaller than the lower limit of the conditional expression (7), it becomes difficult to correct aberrations in balance. If the value is larger than the upper limit of the conditional expression (8), the full length of the zoom lens is excessively extended. If the value is smaller than the lower limit of the conditional expression (8), the fifth lens group $G_5$ is arranged closer to the reduction side. In this case, a mechanism for holding the fifth lens group $G_5$ or a cam cylinder is accommodated, the lens diameter on the reduction side including this mechanism increases, and it becomes difficult to attach the zoom lens to an existing projection-type display device having a limited space for lens arrangement. If the value is larger than the upper limit of the conditional expression (9), the full length of the zoom lens is excessively extended. If the value is smaller than the lower limit of the conditional expression (9), it becomes difficult to correct aberrations in balance.

Figure 25:
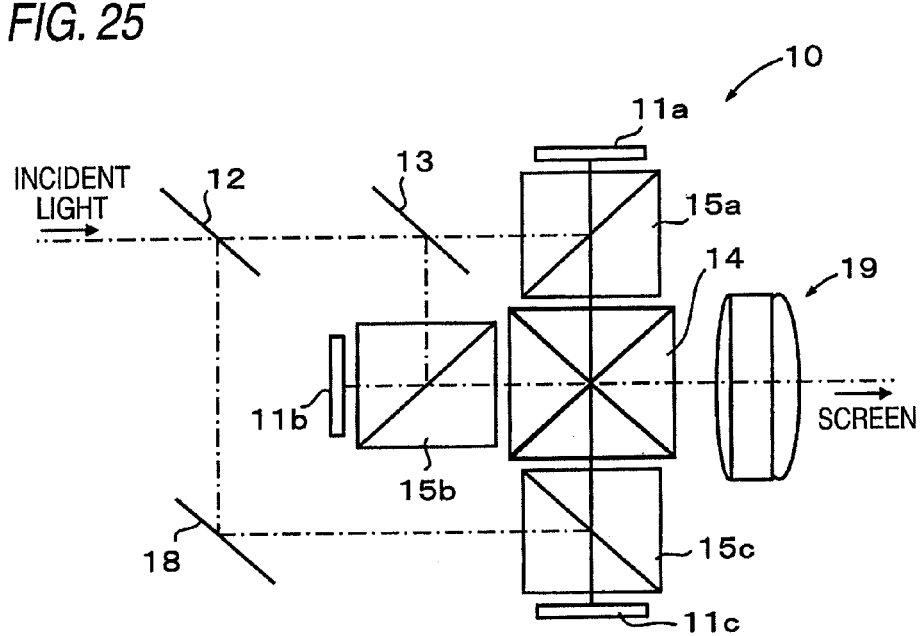
FIG. 25 is a schematic view showing a part of a projection-type display device according to this embodiment.
Figure 26:
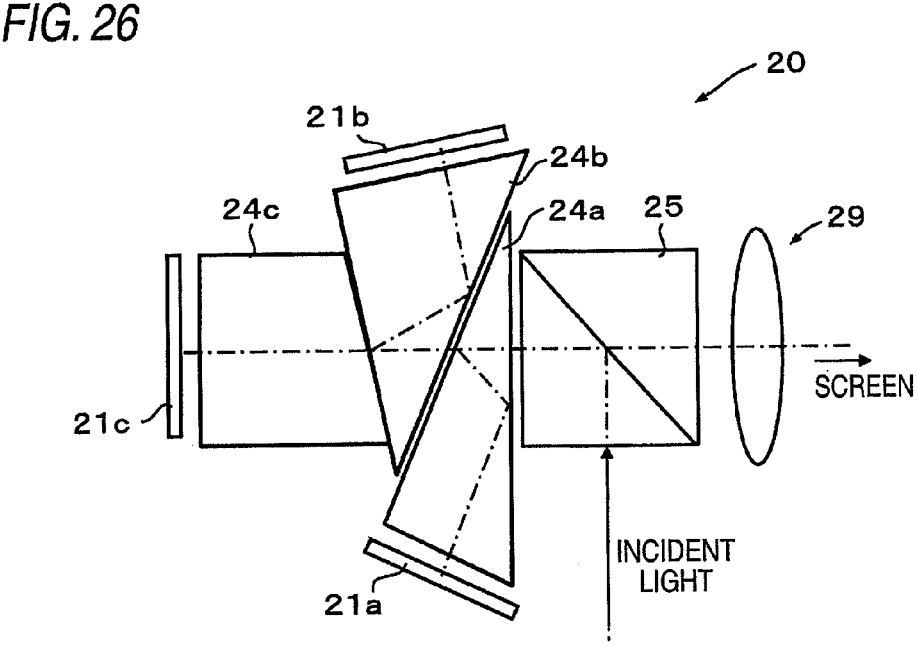
FIG. 26 is a schematic view showing a part of another projection-type display device according to this embodiment.

Next, an embodiment of a projection-type display device according to the invention will be described with reference to FIGS. 25 and 26. FIG. 25 is a schematic view showing a part of a projection-type display device according to an embodiment of the invention. FIG. 26 is a schematic view showing a part of a projection-type display device according to another embodiment of the invention.

The projection-type display device shown in FIG. 25 includes an illumination optical system 10. The illumination optical system 10 includes reflective liquid crystal display panels 11a to 11c corresponding to colors of light, dichroic mirrors 12 and 13 for color split, a cross dichroic prism 14 for color composition, a total reflection mirror 18, and polarization separating prisms 15a to 15c. A light source (not shown) is arranged at the front end of the dichroic mirror 12. White light enters the liquid crystal display panels 11a to 11c corresponding to three color light beams (G light, B light, and R light) from the light source. Then, light is optically modulated and projected onto a screen (not shown) by a projection zoom lens 19 according to the above-described embodiment.

As shown in FIG. 26, the projection-type display device according to another embodiment includes an illumination optical system 20. The illumination optical system 20 includes reflective liquid crystal display panels 21a to 21c corresponding to colors of light, TIR prisms 24a to 24c for color split and color composition, and a polarization separating prism 25. Although the front end of the polarization separating prism 25 is not shown, white light enters the liquid crystal display panels 21a to 21c corresponding to three color light beams (G light, B light, and R light) from the light source. Then, light is optically modulated and projected onto a screen (not shown) by a projection zoom lens 29 according to the above-described embodiment.

The projection zoom lens of the invention may be modified in various ways. For example, the number of lenses of each lens group, a curvature radius of each lens, and a lens spacing (or lens thickness) may be properly changed.

It is effective to use the projection zoom lens of the invention in a projection-type display device using a reflective liquid crystal display panel, but the invention is not limited to the use. The projection zoom lens of the invention may be used as a projection zoom lens of a device using a transmissive liquid crystal display panel or a projection zoom lens of a projection-type display device using different optical modulation means, such as a DMD or the like.

EXAMPLES

Hereinafter, the projection zoom lens of the invention will be described in detail with reference to specific examples.

Example 1

The schematic configuration of a projection zoom lens according to Example 1 is shown in FIGS. 1 and 2. As described above, the projection zoom lens according to Example 1 includes, in order from a magnification side, a first lens group $G_1$ having negative refractive power adapted to have a focusing function with being fixed during power-varying, a second lens group $G_2$ having positive refractive power, a third lens group $G_3$ having negative refractive power, a fourth lens group $G_4$ having positive refractive power, and a fifth lens group $G_5$ positive refractive power, which are moved in an optical axis X direction with correlation for continuous power-varying and correction of shift of an image surface caused by continuous power-varying, and a sixth lens group $G_6$ having positive refractive power adapted to be fixed during power-varying and to include an aperture diaphragm 3 nearest to the magnification side. A glass block 2 mainly having a color composing prism, and an image display surface 1 are arranged on a reduction side of the projection zoom lens.

The first lens group $G_1$ includes a first lens $L_1$ having a positive meniscus lens having a convex surface directed toward the magnification side, a second lens $L_2$ having a negative meniscus lens having a convex surface directed toward the magnification side, a third lens $L_3$ having a piano-concave lens having a concave surface directed toward the reduction side, and a fourth lens $L_4$ having a biconcave lens.

The second lens group $G_2$ includes a fifth lens $L_5$ having a positive meniscus lens having a convex surface directed toward the reduction side, a sixth lens $L_6$ having a positive meniscus lens having a convex surface directed toward the magnification side, and an flare stop 4 made of a mask or the like. The third lens group $G_3$ includes only a seventh lens $L_7$ having a negative meniscus lens having a convex surface directed toward the magnification side.

The fourth lens group $G_4$ includes an eighth lens $L_8$ having a negative meniscus lens having a convex surface directed toward the magnification side, a ninth lens $L_9$ having a biconvex lens, and a tenth lens $L_{10}$ having a biconcave lens. The fifth lens group $G_5$ includes only an eleventh lens $L_{11}$ having a biconvex lens.

The sixth lens group $G_6$ includes a aperture diaphragm 3 as a fixed aperture, a twelfth lens $L_{12}$ having a negative meniscus lens having a convex surface directed toward the magnification side, a thirteenth lens $L_{13}$ having a piano-concave lens having a concave surface directed toward the magnification side, a fourteenth lens $L_{14}$ having a positive meniscus lens having a convex surface directed toward the magnification side, and a fifteenth lens $L_{15}$ and a sixteenth lens $L_{16}$ having biconvex lenses.

The upper part of Table 1 shows a focal length f from the wide-angle end to the telephoto end of the entire system in Example 1 (a focal length in a state where the position of a conjugation point on the magnification side at the wide-angle end is infinity is normalized as 1.000; the same is applied to Tables 2 to 8), a back focal length Bf (air conversion distance. A numerical value when a focal length in a state where the position of a conjugation point on the magnification side at the wide-angle end is infinity is normalized as 1.000 is displayed down to two decimal places; the same is applied to Tables 2 to 8), and Fno.

The middle part of Table 1 shows a curvature radius R of each lens surface (a focal length in a state where the position of a conjugation point on the magnification side at the wide-angle end is infinity is normalized as 1.000; the same is applied to each table), a center thickness of each lens, an air spacing D between lenses (normalized by the same focal length as in the above-described curvature radius R; the same is applied to Tables 2 to 8), and a refractive index Nd and an Abbe number vd of each lens at the d-line. In Table 1 and Tables 2 to 8 described below, numerals corresponding to the symbols R, D, Nd, and vd increase in order from the magnification side.

The lower part of Table 1 shows a distance $D_8$ (variable 1) between the first lens group $G_1$ and the second lens group $G_2$, a distance $D_{13}$ (variable 2) between the second lens group $G_2$ and the third lens group $G_3$, a distance $D_{15}$ (variable 3) between the third lens group $G_3$ and the fourth lens group $G_4$, a distance $D_{21}$ (variable 4) between the fourth lens group $G_4$ and the fifth lens group $G_5$, and a distance $D_{23}$ (variable 5) between the fifth lens group $G_5$ and the sixth lens group $G_6$ at the wide-angle end (WIDE: zoom ratio 1.000), the middle position (MIDDLE: zoom ratio 1.301), and the telephoto end (TELE: zoom ratio 1.550).

TABLE 1 f = 1.000~1.550, Bf = 2.99, Fno. = 2.50

| Surface Number | R | D | Nd | vd |
|---|---|---|---|---|
| 1 | 7.2656 | 0.3865 | 1.77250 | 49.6 |
| 2 | 109.8433 | 0.0188 | | |
| 3 | 6.4512 | 0.1504 | 1.49700 | 81.5 |
| 4 | 2.1093 | 0.6346 | | |
| 5 | ∞ | 0.1391 | 1.49700 | 81.5 |
| 6 | 2.2469 | 0.7710 | | |
| 7 | −12.6358 | 0.1316 | 1.83400 | 37.2 |
| 8 | 3.9859 | Variable 1 | | |
| 9 | −4.2975 | 0.2251 | 1.75520 | 27.5 |
| 10 | −2.8809 | 0.0150 | | |
| 11 | 4.8203 | 0.4078 | 1.83400 | 37.2 |
| 12 | 74.8489 | 0.4513 | | |
| 13 Stop | ∞ | Variable 2 | | |
| 14 | 7.0046 | 0.1241 | 1.80518 | 25.4 |
| 15 | 2.7110 | Variable 3 | | |
| 16 | 4.0899 | 0.1316 | 1.60342 | 38.0 |
| 17 | 2.8590 | 0.1128 | | |
| 18 | 3.0263 | 0.6186 | 1.58144 | 40.7 |
| 19 | −3.5189 | 0.3620 | | |
| 20 | −5.2141 | 0.1316 | 1.80610 | 40.9 |
| 21 | 40.2257 | Variable 4 | | |
| 22 | 5.6348 | 0.3373 | 1.49700 | 81.5 |
| 23 | −3.5773 | Variable 5 | | |
| 24 Diaphragm | ∞ | 0.2619 | | |
| 25 | 1.5891 | 0.0752 | 1.51633 | 64.1 |
| 26 | 1.2151 | 0.5650 | | |
| 27 | −1.1576 | 0.0771 | 1.83481 | 42.7 |
| 28 | ∞ | 0.0301 | | |
| 29 | −6.8321 | 0.2493 | 1.49700 | 81.5 |
| 30 | −1.2917 | 0.4692 | | |
| 31 | 38.5029 | 0.4080 | 1.49700 | 81.5 |
| 32 | −1.7523 | 0.0150 | | |
| 33 | 3.3174 | 0.2937 | 1.49700 | 81.5 |
| 34 | −9.0475 | 0.8169 | | |
| 35 | ∞ | 3.3000 | 1.51633 | 64.1 |
| 36 | ∞ | | | |

| Zoom Ratio | Variable 1 | Variable 2 | Variable 3 | Variable 4 | Variable 5 |
|---|---|---|---|---|---|
| 1.000 (WIDE) | 1.1881 | 1.9621 | 0.7264 | 1.1611 | 0.0752 |
| 1.301 (MIDDLE) | 0.9041 | 1.8072 | 0.2638 | 0.8270 | 1.3107 |
| 1.550 (TELE) | 0.6675 | 1.7481 | 0.3094 | 0.1576 | 2.2303 |

Table 9 shows numerical values corresponding to the conditional expressions (1) to (9) in Example 1.

FIG. 17 is aberration diagrams showing aberrations (spherical aberration, astigmatism, distortion, and lateral chromatic aberration) at the wide-angle end (WIDE), the middle position (MIDDLE), and the telephoto end (TELE) of the projection zoom lens according to Example 1. In FIG. 17 and FIGS. 18 to 24 described below, each spherical aberration diagram shows an aberration curve at the d-line, the F-line, and the C-line. In the drawings, each astigmatism diagram shows aberrations with respect to the sagittal image surface and the tangential image surface, and each lateral chromatic aberration diagram shows aberrations of the F-line and the C-line with respect to the d-line.

As shown in the spherical aberration diagram of FIG. 17, Fno. is constant as 2.50 at the wide-angle end (WIDE), the middle position (MIDDLE), and the telephoto end (TELE).

As will be apparent from FIG. 17 and Table 1, according to the projection zoom lens of Example 1, aberrations can be satisfactorily corrected over the whole zoom region. Thus, a proper back focal length and satisfactory telecentricity on the reduction side can be achieved, and performance such as brightness, compactness, a wide angle of view, and a large zoom ratio can be exhibited with the best balance. In particular, Fno. is 2.50 over the whole zoom region, so that brightness can be maintained constant.

While a half angle of view at the wide-angle end is wide as 28.0°, the zoom ratio is set large as 1.550. Thus, the zoom lens is suitable for a movie theater having a comparatively short projection distance, and it is possible to cope with wide changes in the projection distance.

Example 2

Figure 3:
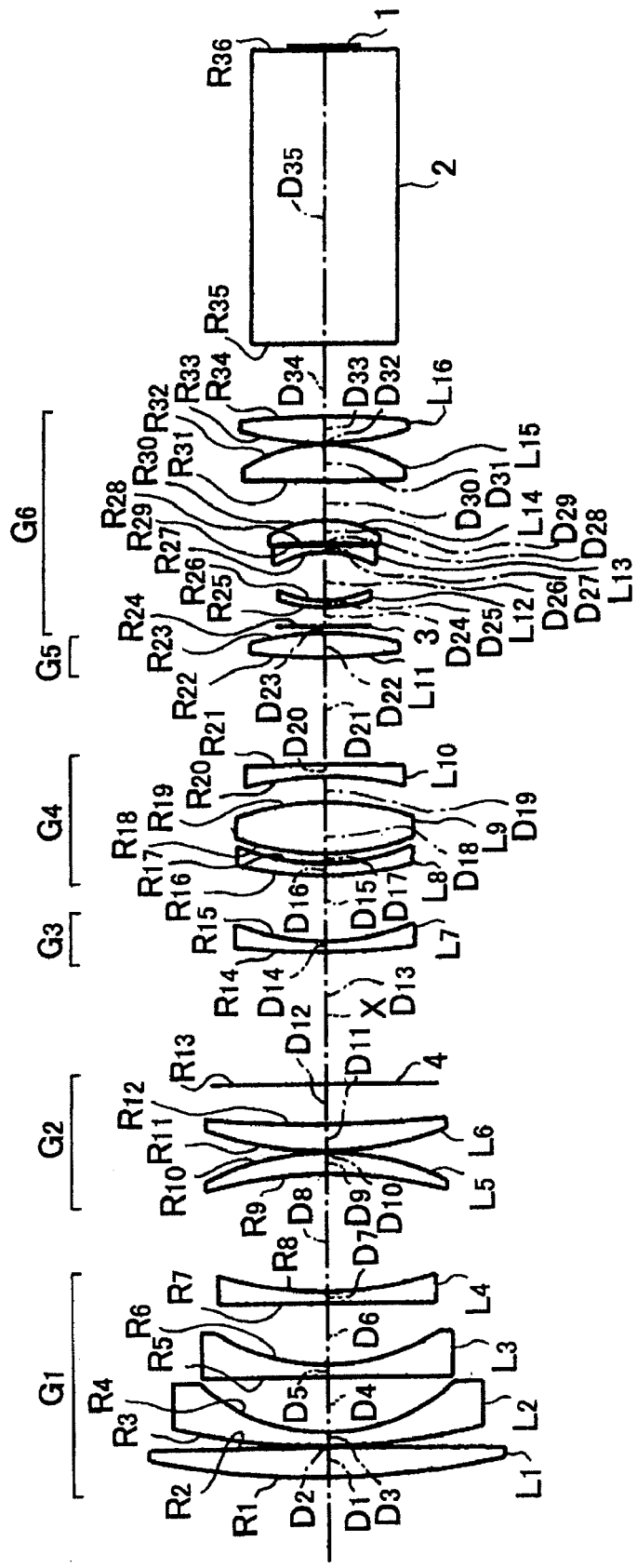
FIG. 3 is a diagram showing the lens configuration of a projection zoom lens according to Example 2.
Figure 4:
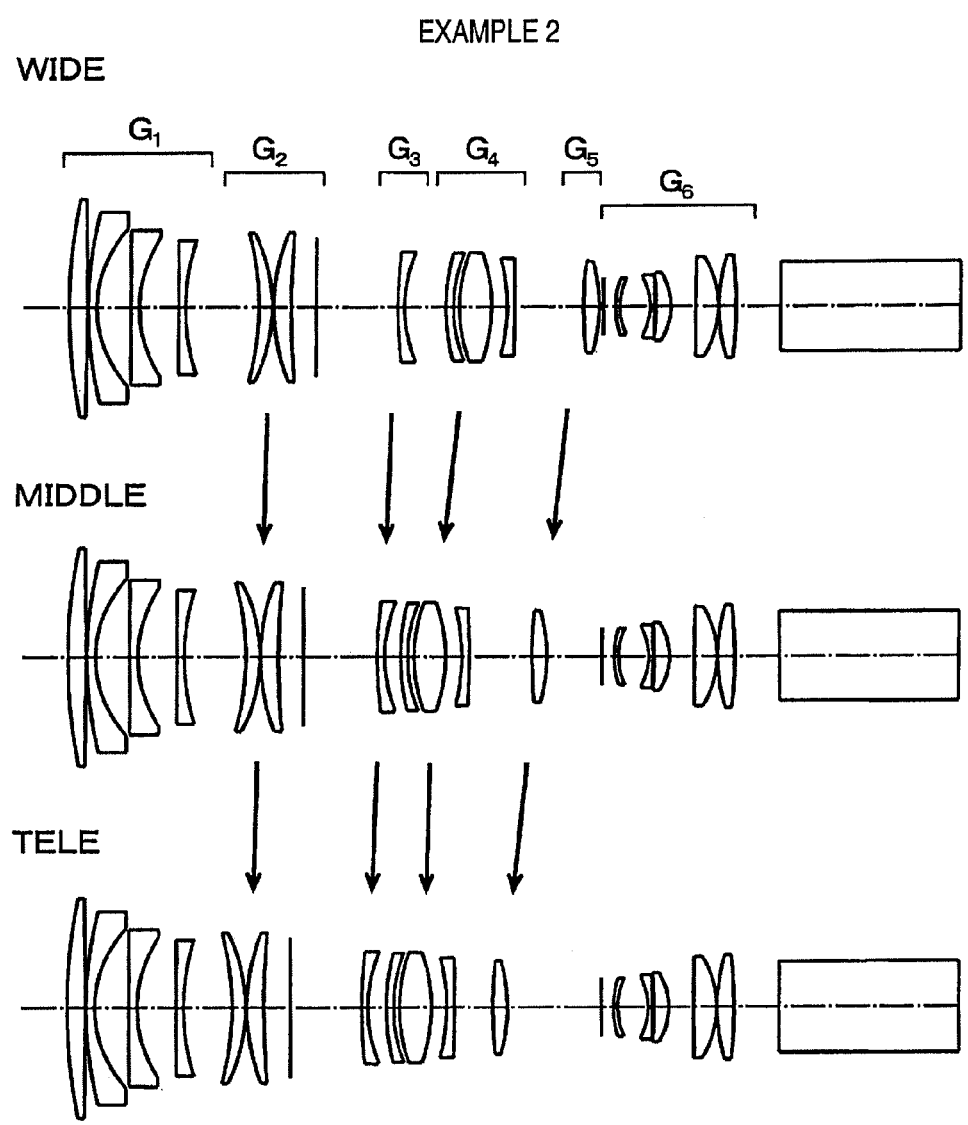
FIG. 4 is a diagram showing movement positions of lens groups of the projection zoom lens according to Example 2 at a wide-angle end (WIDE), a middle position (MIDDLE), and a telephoto end (TELE).

The schematic configuration of a projection zoom lens according to Example 2 is shown in FIGS. 3 and 4. FIG. 3 is a diagram showing the lens configuration at a wide-angle end of a projection zoom lens according to Example 2. FIG. 4 shows movement positions of lens groups at a wide-angle end (WIDE), a middle position (MIDDLE), and a telephoto end (TELE) according to a power-varying operation in a projection zoom lens according to Example 2.

As shown in FIG. 3, the projection zoom lens according to Example 2 basically has a configuration similar to that of Example 1, but is different in that the first lens $L_1$ in the first lens group $G_1$ has a biconvex lens, and the tenth lens $L_{10}$ in the fourth lens group $G_4$ has a negative meniscus lens having a convex surface directed toward the reduction side.

The upper part of Table 2 shows a focal length f from the wide-angle end to the telephoto end of the entire system in Example 2, a back focal length Bf (air conversion distance), and Fno.

The middle part of Table 2 shows a curvature radius R of each lens surface, a center thickness of each lens, an air spacing D between lenses, and a refractive index Nd and an Abbe number vd of each lens at the d-line.

The lower part of Table 2 shows a distance $D_8$ (variable 1) between the first lens group $G_1$ and the second lens group $G_2$, a distance $D_{13}$ (variable 2) between the second lens group $G_2$ and the third lens group $G_3$, a distance $D_{15}$ (variable 3) between the third lens group $G_3$ and the fourth lens group $G_4$, a distance $D_{21}$ (variable 4) between the fourth lens group $G_4$ and the fifth lens group $G_5$, and a distance $D_{23}$ (variable 5) between the fifth lens group $G_5$ and the sixth lens group $G_6$ at the wide-angle end (WIDE: zoom ratio 1.000), the middle position (MIDDLE: zoom ratio 1.224), and the telephoto end (TELE: zoom ratio 1.400).

TABLE 2 f = 1.000~1.400, Bf = 2.99, Fno. = 2.50

| Surface Number | R | D | Nd | vd |
|---|---|---|---|---|
| 1 | 9.6939 | 0.3279 | 1.77250 | 49.6 |
| 2 | −159.7455 | 0.0188 | | |
| 3 | 7.2301 | 0.1505 | 1.49700 | 81.5 |
| 4 | 2.0961 | 0.6194 | | |
| 5 | ∞ | 0.1392 | 1.49700 | 81.5 |
| 6 | 2.3011 | 0.6964 | | |
| 7 | −324.7890 | 0.1317 | 1.83400 | 37.2 |
| 8 | 3.9365 | Variable 1 | | |
| 9 | −5.0868 | 0.2400 | 1.75520 | 27.5 |
| 10 | −3.0518 | 0.0151 | | |
| 11 | 3.7610 | 0.3008 | 1.83400 | 37.2 |
| 12 | 13.8891 | 0.4515 | | |
| 13 Stop | ∞ | Variable 2 | | |
| 14 | 7.7401 | 0.1242 | 1.80518 | 25.4 |
| 15 | 2.4942 | Variable 3 | | |
| 16 | 3.8965 | 0.1317 | 1.60342 | 38.0 |

TABLE 2-continued f = 1.000~1.400, Bf = 2.99, Fno. = 2.50

| | | | | |
|---|---|---|---|---|
| 17 | 2.4811 | 0.1129 | | |
| 18 | 2.7642 | 0.5890 | 1.58144 | 40.7 |
| 19 | −2.9367 | 0.2886 | | |
| 20 | −3.4523 | 0.1317 | 1.80610 | 40.9 |
| 21 | −36.8824 | Variable 4 | | |
| 22 | 6.6385 | 0.2775 | 1.49700 | 81.5 |
| 23 | −3.0882 | Variable 5 | | |
| 24 Diaphragm | ∞ | 0.2177 | | |
| 25 | 1.6063 | 0.0753 | 1.51633 | 64.1 |
| 26 | 1.1906 | 0.5468 | | |
| 27 | −1.0960 | 0.0771 | 1.83481 | 42.7 |
| 28 | ∞ | 0.0301 | | |
| 29 | −6.3196 | 0.2542 | 1.49700 | 81.5 |
| 30 | −1.2151 | 0.4451 | | |
| 31 | 45.7583 | 0.4127 | 1.49700 | 81.5 |
| 32 | −1.6785 | 0.0151 | | |
| 33 | 3.2025 | 0.2960 | 1.49700 | 81.5 |
| 34 | −9.0333 | 0.8184 | | |
| 35 | ∞ | 3.3000 | 1.51633 | 64.1 |
| 36 | ∞ | | | |

| Zoom Ratio | Variable 1 | Variable 2 | Variable 3 | Variable 4 | Variable 5 |
|---|---|---|---|---|---|
| 1.000 (WIDE) | 1.2971 | 1.4905 | 0.7562 | 1.2246 | 0.0753 |
| 1.224 (MIDDLE) | 1.1009 | 1.3312 | 0.3021 | 1.1348 | 0.9747 |
| 1.400 (TELE) | 0.8718 | 1.2783 | 0.3255 | 0.6997 | 1.6684 |

Table 9 shows numerical values corresponding to the conditional expressions (1) to (9) in Example 2.

FIG. 18 is aberration diagrams showing aberrations (spherical aberration, astigmatism, distortion, and lateral chromatic aberration) at the wide-angle end (WIDE), the middle position (MIDDLE), and the telephoto end (TELE) of the projection zoom lens according to Example 2.

As will be apparent from FIG. 18 and Table 2, according to the projection zoom lens of Example 2, aberrations can be satisfactorily corrected over the whole zoom region. Thus, a proper back focal length and satisfactory telecentricity on the reduction side can be achieved, and performance such as brightness, compactness, a wide angle of view, and a large zoom ratio can be exhibited with the best balance. In particular, Fno. is 2.50 over the whole zoom region, so that brightness can be maintained constant.

While a half angle of view at the wide-angle end is wide as 28.0°, the zoom ratio is set large as 1.400. Thus, the zoom lens is suitable for a movie theater having a comparatively short projection distance, and it is possible to cope with wide changes in the projection distance.

Example 3

Figure 5:
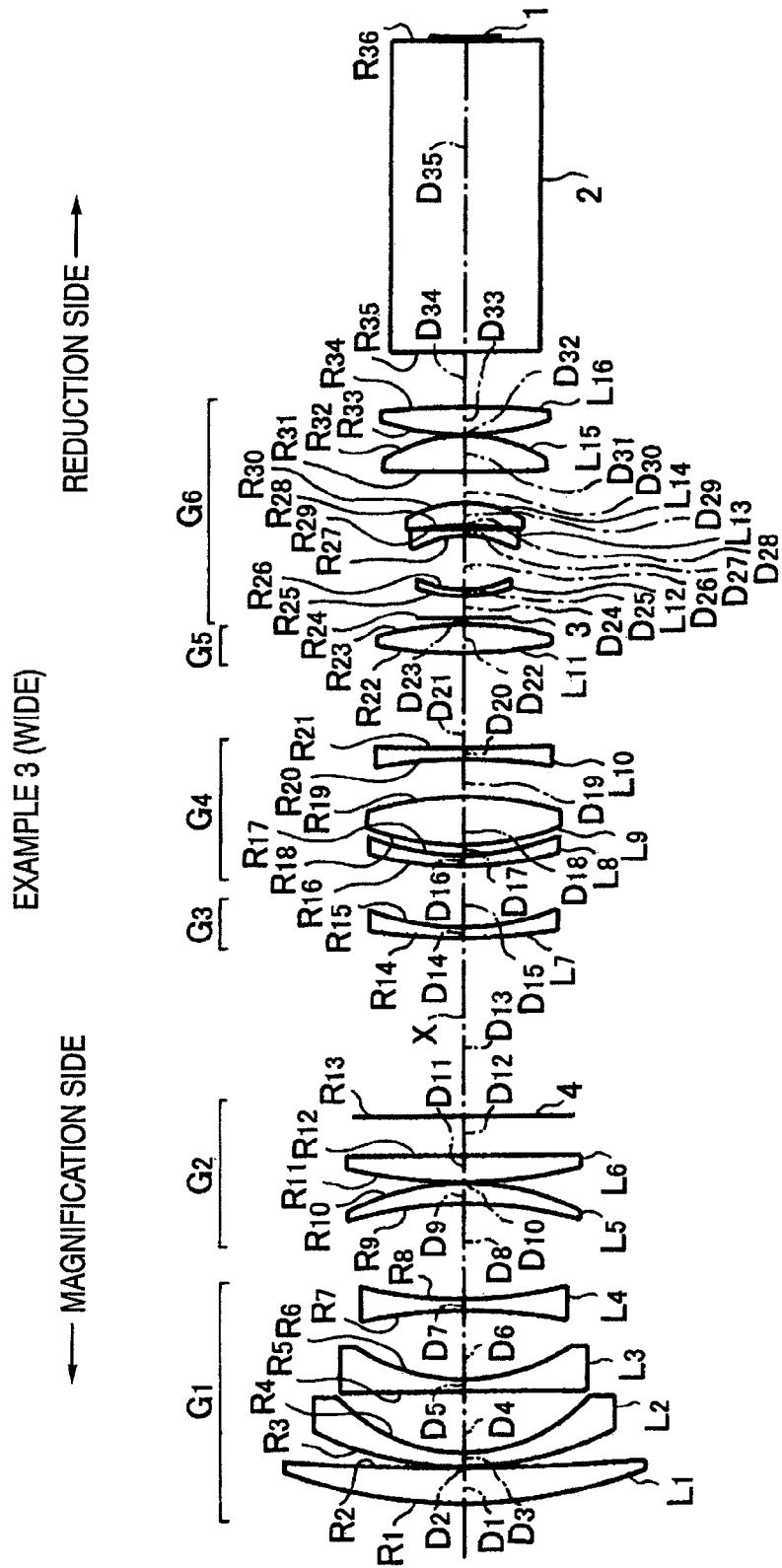
FIG. 5 is a diagram showing the lens configuration of a projection zoom lens according to Example 3.
Figure 6:
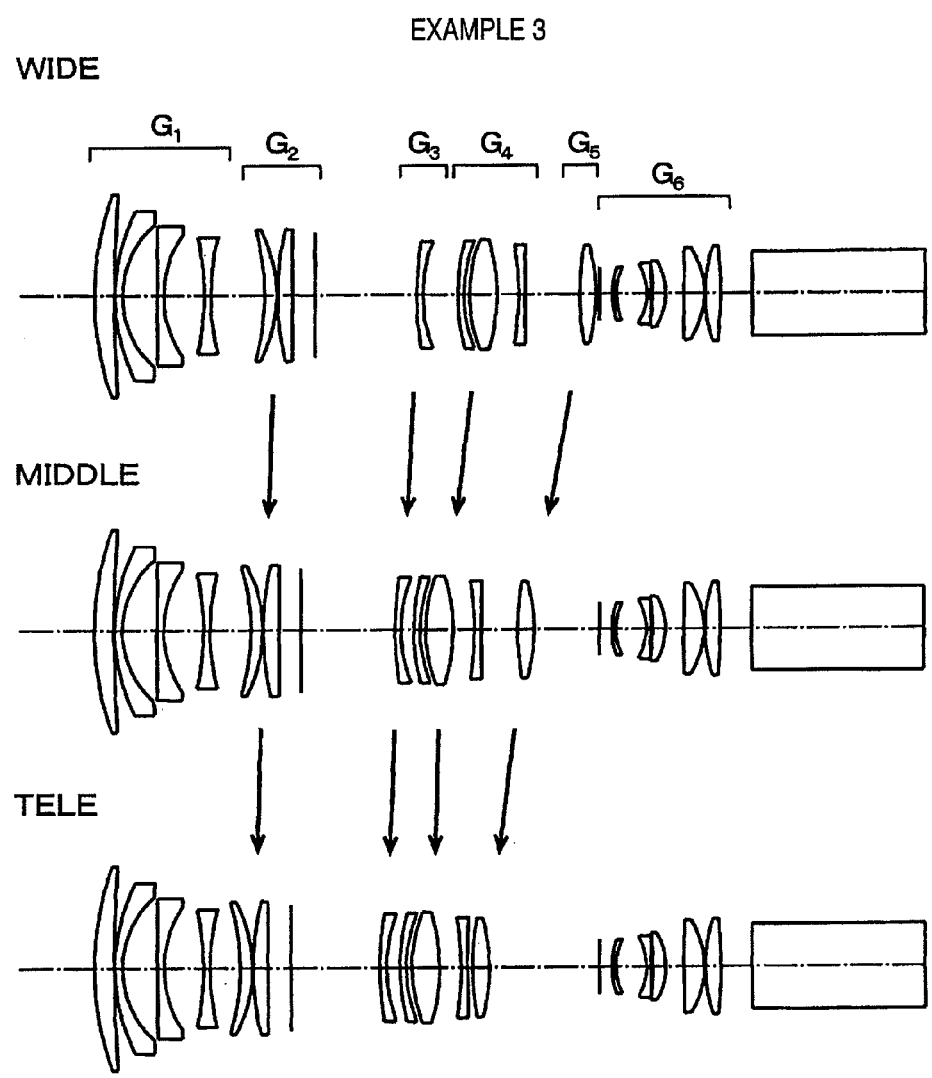
FIG. 6 is a diagram showing movement positions of lens groups of the projection zoom lens according to Example 3 at a wide-angle end (WIDE), a middle position (MIDDLE), and a telephoto end (TELE).

The schematic configuration of a projection zoom lens according to Example 3 is shown in FIGS. 5 and 6. FIG. 5 is a diagram showing the lens configuration at a wide-angle end of a projection zoom lens according to Example 3. FIG. 6 shows movement positions of lens groups at a wide-angle end (WIDE), a middle position (MIDDLE), and a telephoto end (TELE) according to a power-varying operation in a projection zoom lens according to Example 3.

As shown in FIG. 5, the projection zoom lens according to Example 3 basically has a configuration similar to that of Example 1, but is different in that the sixth lens $L_6$ in the second lens group $G_2$ has a biconvex lens.

The upper part of Table 3 shows a focal length f of the entire system from the wide-angle end to the telephoto end in Example 3, a back focal length Bf (air conversion distance), and Fno.

The middle part of Table 3 shows a curvature radius R of each lens surface, a center thickness of each lens, an air spacing D between lenses, and a refractive index Nd and an Abbe number νd of each lens at the d-line.

The lower part of Table 3 shows a distance $D_8$ (variable 1) between the first lens group $G_1$ and the second lens group $G_2$, a distance $D_{13}$ (variable 2) between the second lens group $G_2$ and the third lens group $G_3$, a distance $D_{15}$ (variable 3) between the third lens group $G_3$ and the fourth lens group $G_4$, a distance $D_{21}$ (variable 4) between the fourth lens group $G_4$ and the fifth lens group $G_5$, and a distance $D_{23}$ (variable 5) between the fifth lens group $G_5$ and the sixth lens group $G_6$ at the wide-angle end (WIDE: zoom ratio 1.000), the middle position (MIDDLE: zoom ratio 1.301), and the telephoto end (TELE: zoom ratio 1.550).

TABLE 3 f = 1.000~1.550, Bf = 2.76, Fno. = 2.50

| Surface Number | R | D | Nd | νd |
|---|---|---|---|---|
| 1 | 5.5492 | 0.3742 | 1.77250 | 49.6 |
| 2 | 24.8437 | 0.0174 | | |
| 3 | 3.5627 | 0.1388 | 1.49700 | 81.5 |
| 4 | 1.7957 | 0.6503 | | |
| 5 | ∞ | 0.1284 | 1.49700 | 81.5 |
| 6 | 2.0368 | 0.7393 | | |
| 7 | −5.5194 | 0.1214 | 1.80100 | 35.0 |
| 8 | 4.5912 | Variable 1 | | |
| 9 | −4.4623 | 0.2198 | 1.75520 | 27.5 |
| 10 | −2.7390 | 0.0139 | | |
| 11 | 5.2890 | 0.2867 | 1.83400 | 37.2 |
| 12 | −291.7279 | 0.4163 | | |
| 13 Stop | ∞ | Variable 2 | | |
| 14 | 6.6175 | 0.1145 | 1.80518 | 25.4 |
| 15 | 2.6879 | Variable 3 | | |
| 16 | 3.8033 | 0.1214 | 1.60342 | 38.0 |
| 17 | 2.6568 | 0.1041 | | |
| 18 | 2.8119 | 0.5198 | 1.58144 | 40.7 |
| 19 | −3.4902 | 0.4017 | | |
| 20 | −5.4361 | 0.1214 | 1.80610 | 40.9 |
| 21 | 25.2084 | Variable 4 | | |
| 22 | 5.0854 | 0.3109 | 1.49700 | 81.5 |
| 23 | −3.4995 | Variable 5 | | |
| 24 Diaphragm | ∞ | 0.2351 | | |
| 25 | 1.5425 | 0.0694 | 1.51633 | 64.1 |
| 26 | 1.1740 | 0.5788 | | |
| 27 | −1.0754 | 0.0711 | 1.83481 | 42.7 |
| 28 | ∞ | 0.0347 | | |
| 29 | −5.1568 | 0.2496 | 1.49700 | 81.5 |
| 30 | −1.2199 | 0.3392 | | |
| 31 | 33.7969 | 0.3836 | 1.49700 | 81.5 |
| 32 | −1.5782 | 0.0139 | | |
| 33 | 2.8494 | 0.2874 | 1.49700 | 81.5 |
| 34 | −9.6262 | 0.5854 | | |
| 35 | ∞ | 3.3000 | 1.51633 | 64.1 |
| 36 | ∞ | | | |

| Zoom Ratio | Variable 1 | Variable 2 | Variable 3 | Variable 4 | Variable 5 |
|---|---|---|---|---|---|
| 1.000 (WIDE) | 1.0030 | 1.9058 | 0.6586 | 1.0230 | 0.0694 |
| 1.301 (MIDDLE) | 0.7519 | 1.7517 | 0.2381 | 0.6896 | 1.2285 |
| 1.550 (TELE) | 0.5583 | 1.6573 | 0.2639 | 0.0999 | 2.0804 |

Table 9 shows numerical values corresponding to the conditional expressions (1) to (9) in Example 3.

FIG. 19 is aberration diagrams showing aberrations (spherical aberration, astigmatism, distortion, and lateral chromatic aberration) at the wide-angle end (WIDE), the middle position (MIDDLE), and the telephoto end (TELE) of the projection zoom lens according to Example 3.

As will be apparent from FIG. 19 and Table 3, according to the projection zoom lens of Example 3, aberrations can be satisfactorily corrected over the whole zoom region. Thus, a proper back focal length and satisfactory telecentricity on the reduction side can be achieved, and performance such as brightness, compactness, a wide angle of view, and a large zoom ratio can be exhibited with the best balance. In particular, Fno. is 2.50 over the whole zoom region, so that brightness can be maintained constant.

While a half angle of view at the wide-angle end is wide as 26.1°, the zoom ratio is set large as 1.550. Thus, the zoom lens is suitable for a movie theater having a comparatively short projection distance, and it is possible to cope with wide changes in the projection distance.

Example 4

Figure 7:
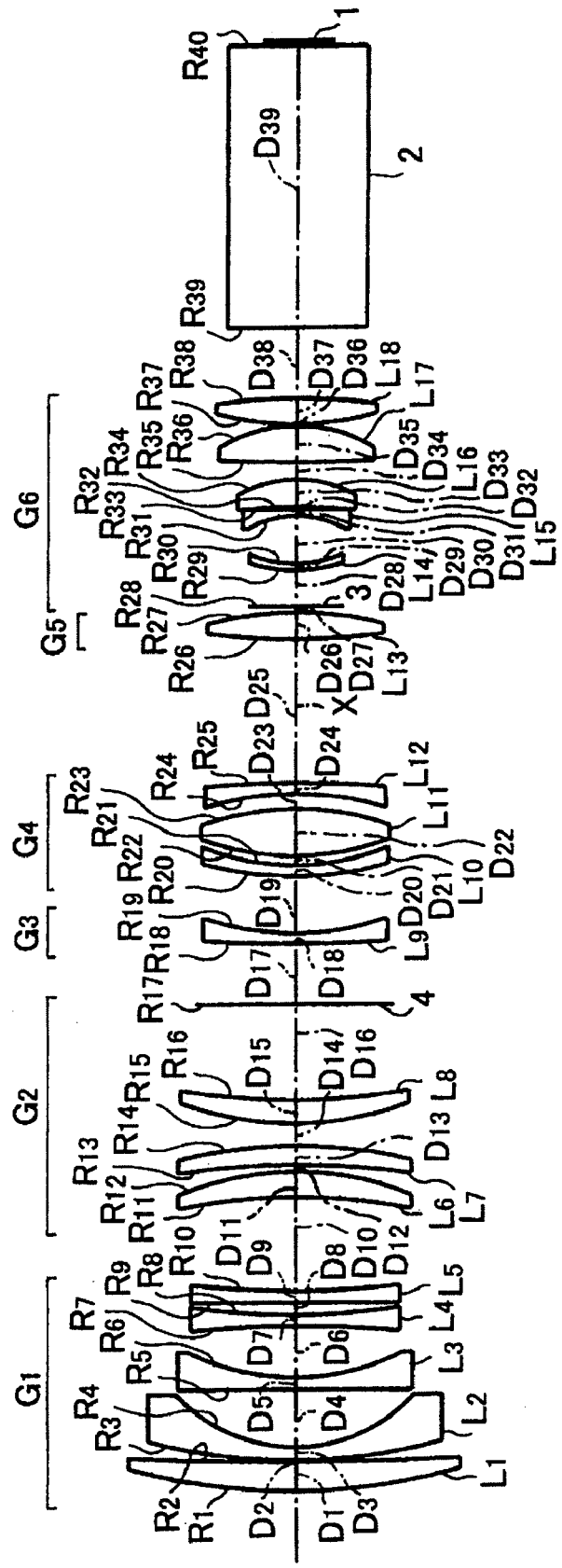
FIG. 7 is a diagram showing the lens configuration of a projection zoom lens according to Example 4.
Figure 8:
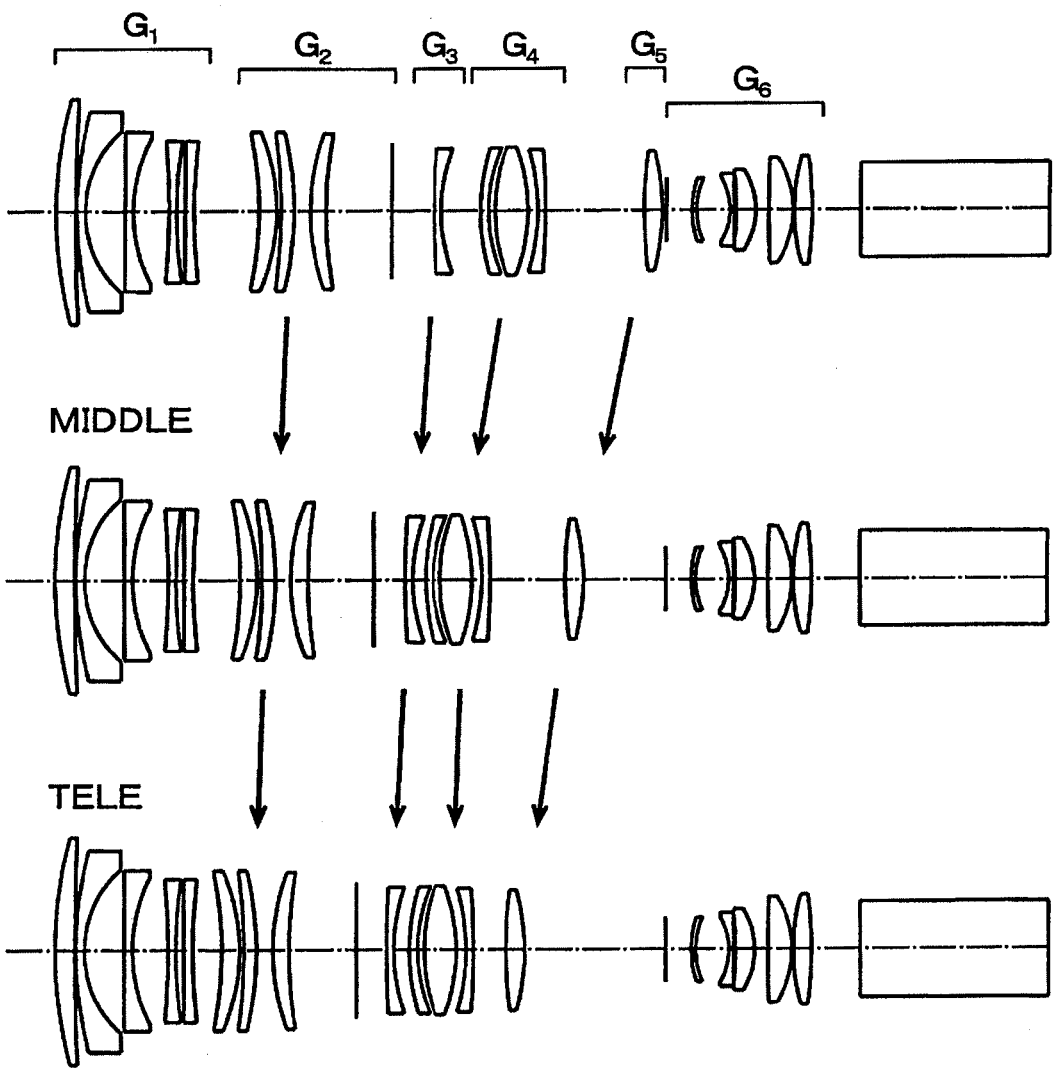
FIG. 8 is a diagram showing movement positions of lens groups of the projection zoom lens according to Example 4 at a wide-angle end (WIDE), a middle position (MIDDLE), and a telephoto end (TELE).

The schematic configuration of a projection zoom lens according to Example 4 is shown in FIGS. 7 and 8. FIG. 7 is a diagram showing the lens configuration at a wide-angle end of a projection zoom lens according to Example 4. FIG. 8 shows movement positions of lens groups at a wide-angle end (WIDE), a middle position (MIDDLE), and a telephoto end (TELE) according to a power-varying operation in a projection zoom lens according to Example 4.

As shown in FIG. 7, the projection zoom lens according to Example 4 basically has a configuration similar to that of Example 1, but is different in that the first lens group $G_1$ includes four negative lenses (a second lens $L_2$ having a negative meniscus lens having a convex surface directed toward the magnification side, a third lens $L_3$ having a plano-concave lens having a concave surface directed toward the reduction side, a fourth lens $L_4$ having a biconcave lens, and a fifth lens $L_5$ having a negative meniscus lens having a convex surface directed toward the magnification side), the second lens group $G_2$ includes three positive lenses (a fifth lens $L_5$ and a sixth lens $L_6$ having positive meniscus lenses having a convex surface directed toward the reduction side, and a seventh lens $L_7$ having a positive meniscus lens having a convex surface directed toward the magnification side), and the fourth lens group $G_4$ is configured such that a lens (an eleventh lens $L_{11}$) nearest to the reduction side has a negative meniscus lens having a convex surface directed toward the reduction side.

The upper part of Table 4 shows a focal length f from the wide-angle end to the telephoto end of the entire system in Example 4, a back focal length Bf (air conversion distance), and Fno.

The middle part of Table 4 shows a curvature radius R of each lens surface, a center thickness of each lens, an air spacing D between lenses, and a refractive index Nd and an Abbe number vd of each lens at the d-line.

The lower part of Table 4 shows a distance $D_{10}$ (variable 1) between the first lens group $G_1$ and the second lens group $G_2$, a distance $D_{17}$ (variable 2) between the second lens group $G_2$ and the third lens group $G_3$, a distance $D_{19}$ (variable 3) between the third lens group $G_3$ an the fourth lens group $G_4$, a distance $D_{25}$ (variable 4) between the fourth lens group $G_4$ and the fifth lens group $G_5$, and a distance $D_{27}$ (variable 5) between the fifth lens group $G_5$ and the sixth lens group $G_6$ at the wide-angle end (WIDE: zoom ratio 1.000), the middle position (MIDDLE: zoom ratio 1.301), and the telephoto end (TELE: zoom ratio 1.550).

TABLE 4 f = 1.000~1.550, Bf = 3.00, Fno. = 2.50

| Surface Number | R | D | Nd | vd |
|---|---|---|---|---|
| 1 | 7.2795 | 0.3369 | 1.77250 | 49.6 |
| 2 | 38.1763 | 0.0189 | | |
| 3 | 6.6254 | 0.1509 | 1.49700 | 81.5 |
| 4 | 1.8700 | 0.6759 | | |
| 5 | ∞ | 0.1396 | 1.49700 | 81.5 |
| 6 | 2.7483 | 0.6062 | | |
| 7 | −12.9106 | 0.1321 | 1.80518 | 25.4 |
| 8 | 8.1616 | 0.1443 | | |
| 9 | 372.2757 | 0.1321 | 1.61800 | 63.3 |
| 10 | 9.8207 | Variable 1 | | |
| 11 | −6.9945 | 0.2987 | 1.71736 | 29.5 |
| 12 | −3.5383 | 0.0755 | | |
| 13 | −9.7372 | 0.2208 | 1.69895 | 30.1 |
| 14 | −5.7385 | 0.2632 | | |
| 15 | 3.7753 | 0.2731 | 1.69895 | 30.1 |
| 16 | 7.5168 | 1.1320 | | |
| 17 Stop | ∞ | Variable 2 | | |
| 18 | 16.6533 | 0.1245 | 1.80518 | 25.4 |
| 19 | 3.1017 | Variable 3 | | |
| 20 | 3.8273 | 0.1321 | 1.60342 | 38.0 |
| 21 | 2.7267 | 0.1132 | | |
| 22 | 3.0580 | 0.5606 | 1.58144 | 40.7 |
| 23 | −3.1944 | 0.1698 | | |
| 24 | −3.6320 | 0.1321 | 1.80610 | 40.9 |
| 25 | −13.5403 | Variable 4 | | |
| 26 | 7.3862 | 0.3208 | 1.49700 | 81.5 |
| 27 | −3.8950 | Variable 5 | | |
| 28 Diaphragm | ∞ | 0.4223 | | |
| 29 | 1.7521 | 0.0755 | 1.51633 | 64.1 |
| 30 | 1.2906 | 0.5685 | | |
| 31 | −1.1296 | 0.0774 | 1.83481 | 42.7 |
| 32 | ∞ | 0.0302 | | |
| 33 | −7.0809 | 0.3232 | 1.49700 | 81.5 |
| 34 | −1.3609 | 0.2064 | | |
| 35 | 19.9822 | 0.4247 | 1.49700 | 81.5 |
| 36 | −1.7001 | 0.0151 | | |
| 37 | 3.4253 | 0.3063 | 1.49700 | 81.5 |
| 38 | −6.9426 | 0.8271 | | |
| 39 | ∞ | 3.3000 | 1.51633 | 64.1 |
| 40 | ∞ | | | |

| Zoom Ratio | Variable 1 | Variable 2 | Variable 3 | Variable 4 | Variable 5 |
|---|---|---|---|---|---|
| 1.000 (WIDE) | 1.0914 | 0.7210 | 0.6752 | 1.6962 | 0.0755 |
| 1.301 (MIDDLE) | 0.7892 | 0.5374 | 0.2230 | 1.2954 | 1.4143 |
| 1.550 (TELE) | 0.4874 | 0.5165 | 0.2684 | 0.5537 | 2.4333 |

Table 9 shows numerical values corresponding to the conditional expressions (1) to (9) in Example 4.

FIG. 20 is aberration diagrams showing aberrations (spherical aberration, astigmatism, distortion, and lateral chromatic aberration) at the wide-angle end (WIDE), the middle position (MIDDLE), and the telephoto end (TELE) of the projection zoom lens according to Example 4.

As will be apparent from FIG. 20 and Table 4, according to the projection zoom lens of Example 4, aberrations can be satisfactorily corrected over the whole zoom region. Thus, a proper back focal length and satisfactory telecentricity on the reduction side can be achieved, and performance such as brightness, compactness, a wide angle of view, and a large zoom ratio can be exhibited with the best balance. In particular, Fno. is 2.50 over the whole zoom region, so that brightness can be maintained constant.

While a half angle of view at the wide-angle end is wide as 28.1°, the zoom ratio is set large as 1.550. Thus, the zoom lens is suitable for a movie theater having a comparatively short projection distance, and it is possible to cope with wide changes in the projection distance.

Example 5

Figure 9:
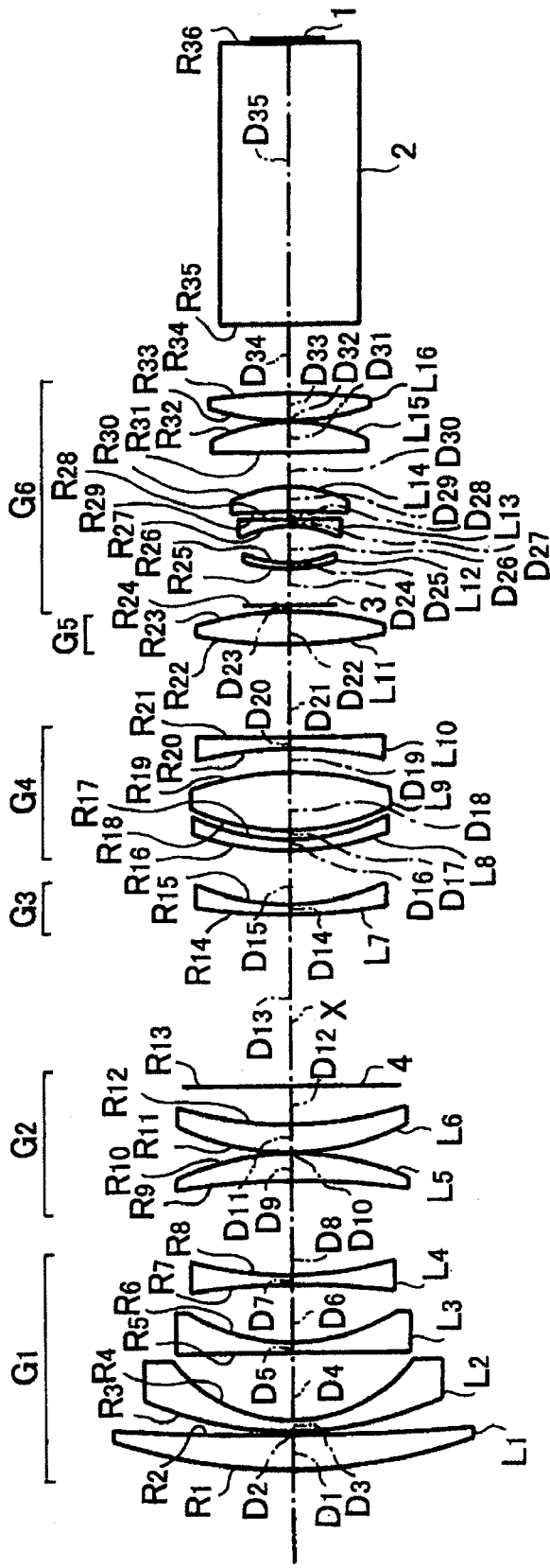
FIG. 9 is a diagram showing the lens configuration of a projection zoom lens according to Example 5.
Figure 10:
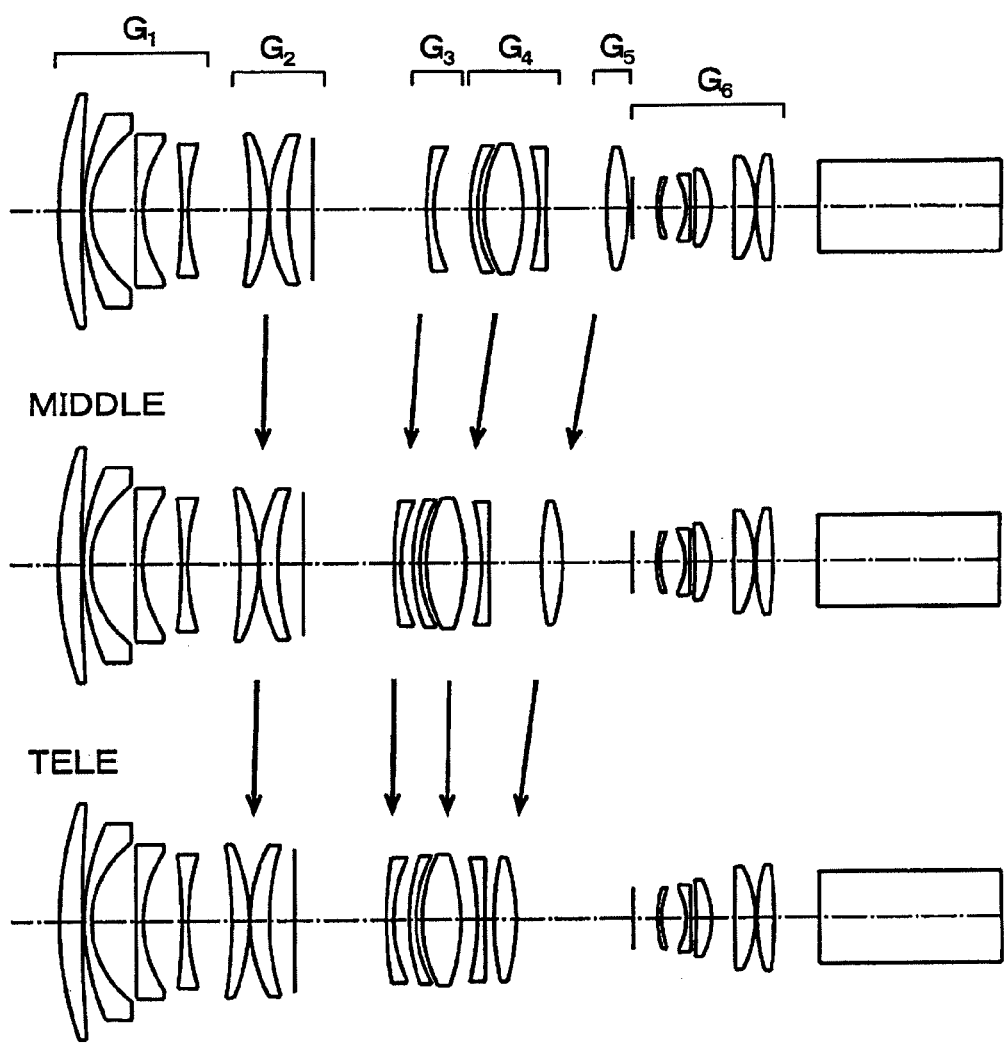
FIG. 10 is a diagram showing movement positions of lens groups of the projection zoom lens according to Example 5 at a wide-angle end (WIDE), a middle position (MIDDLE), and a telephoto end (TELE).

The schematic configuration of a projection zoom lens according to Example 5 is shown in FIGS. 9 and 10. FIG. 9 is a diagram showing the lens configuration at a wide-angle end of a projection zoom lens according to Example 5. FIG. 10 shows movement positions of lens groups at a wide-angle end (WIDE), a middle position (MIDDLE), and a telephoto end (TELE) according to a power-varying operation in a projection zoom lens according to Example 5.

As shown in FIG. 9, the projection zoom lens according to Example 5 basically has a configuration similar to that of Example 1.

The upper part of Table 5 shows a focal length f from the wide-angle end to the telephoto end of the entire system in Example 2, a back focal length Bf (air conversion distance), and Fno.

The middle part of Table 5 shows a curvature radius R of each lens surface, a center thickness of each lens, an air spacing D between lenses, and a refractive index Nd and an Abbe number νd of each lens at the d-line.

The lower part of Table 5 shows a distance $D_8$ (variable 1) between the first lens group $G_1$ and the second lens group $G_2$, a distance $D_{13}$ (variable 2) between the second lens group $G_2$ and the third lens group $G_3$, a distance $D_{15}$ (variable 3) between the third lens group $G_3$ and the fourth lens group $G_4$, a distance $D_{21}$ (variable 4) between the fourth lens group $G_4$ and the fifth lens group $G_5$, and a distance $D_{23}$ (variable 5) between the fifth lens group $G_5$ and the sixth lens group $G_6$ at the wide-angle end (WIDE: zoom ratio 1.000), the middle position (MIDDLE: zoom ratio 1.286), and the telephoto end (TELE: zoom ratio 1.520).

TABLE 5 f = 1.000~1.520, Bf = 2.98, Fno. = 2.50

| Surface Number | R | D | Nd | νd |
|---|---|---|---|---|
| 1 | 6.4293 | 0.4001 | 1.77250 | 49.6 |
| 2 | 30.1584 | 0.0449 | | |
| 3 | 4.2721 | 0.1197 | 1.49700 | 81.5 |
| 4 | 1.7602 | 0.7901 | | |
| 5 | ∞ | 0.1197 | 1.49700 | 81.5 |
| 6 | 2.2661 | 0.6768 | | |
| 7 | −9.2294 | 0.1122 | 1.80100 | 35.0 |
| 8 | 4.1587 | Variable 1 | | |
| 9 | −8.9935 | 0.3163 | 1.80518 | 25.4 |
| 10 | −3.3351 | 0.0150 | | |
| 11 | 2.9516 | 0.3284 | 1.78590 | 44.2 |
| 12 | 4.4716 | 0.4489 | | |
| 13 Stop | ∞ | Variable 2 | | |
| 14 | 6.6554 | 0.1234 | 1.80518 | 25.4 |
| 15 | 2.6225 | Variable 3 | | |
| 16 | 3.1852 | 0.1309 | 1.69895 | 30.1 |
| 17 | 2.4038 | 0.1122 | | |
| 18 | 2.6541 | 0.6902 | 1.58144 | 40.7 |
| 19 | −3.4854 | 0.2756 | | |
| 20 | −4.6974 | 0.1309 | 1.80610 | 40.9 |
| 21 | 41.9460 | Variable 4 | | |
| 22 | 5.4562 | 0.3891 | 1.49700 | 81.5 |
| 23 | −3.7103 | Variable 5 | | |
| 24 Diaphragm | ∞ | 0.4254 | | |
| 25 | 1.7190 | 0.0748 | 1.51633 | 64.1 |
| 26 | 1.3451 | 0.4348 | | |
| 27 | −1.2422 | 0.0767 | 1.83481 | 42.7 |
| 28 | ∞ | 0.0937 | | |
| 29 | −10.3891 | 0.2911 | 1.49700 | 81.5 |
| 30 | −1.4436 | 0.3975 | | |

TABLE 5-continued f = 1.000~1.520, Bf = 2.98, Fno. = 2.50

| | | | | |
|---|---|---|---|---|
| 31 | 59.8978 | 0.3674 | 1.49700 | 81.5 |
| 32 | −2.0314 | 0.0150 | | |
| 33 | 3.1914 | 0.3100 | 1.49700 | 81.5 |
| 34 | −7.7759 | 0.8010 | | |
| 35 | ∞ | 3.3000 | 1.51633 | 64.1 |
| 36 | ∞ | | | |

| Zoom Ratio | Variable 1 | Variable 2 | Variable 3 | Variable 4 | Variable 5 |
|---|---|---|---|---|---|
| 1.000 (WIDE) | 1.0935 | 2.0169 | 0.6368 | 1.1065 | 0.0748 |
| 1.286 (MIDDLE) | 0.9272 | 1.6006 | 0.2154 | 0.9243 | 1.2609 |
| 1.520 (TELE) | 0.7566 | 1.6246 | 0.2705 | 0.1618 | 2.1151 |

Table 9 shows numerical values corresponding to the conditional expressions (1) to (9) in Example 5.

FIG. 21 is aberration diagrams showing aberrations (spherical aberration, astigmatism, distortion, and lateral chromatic aberration) at the wide-angle end (WIDE), the middle position (MIDDLE), and the telephoto end (TELE) of the projection zoom lens according to Example 5.

As will be apparent from FIG. 21 and Table 5, according to the projection zoom lens of Example 5, aberrations can be satisfactorily corrected over the whole zoom region. Thus, a proper back focal length and satisfactory telecentricity on the reduction side can be achieved, and performance such as brightness, compactness, a wide angle of view, and a large zoom ratio can be exhibited with the best balance. In particular, Fno. is 2.50 over the whole zoom region, so that brightness can be maintained constant.

While a half angle of view at the wide-angle end is wide as 27.9°, the zoom ratio is set large as 1.520. Thus, the zoom lens is suitable for a movie theater having a comparatively short projection distance, and it is possible to cope with wide changes in the projection distance.

Example 6

Figure 11:
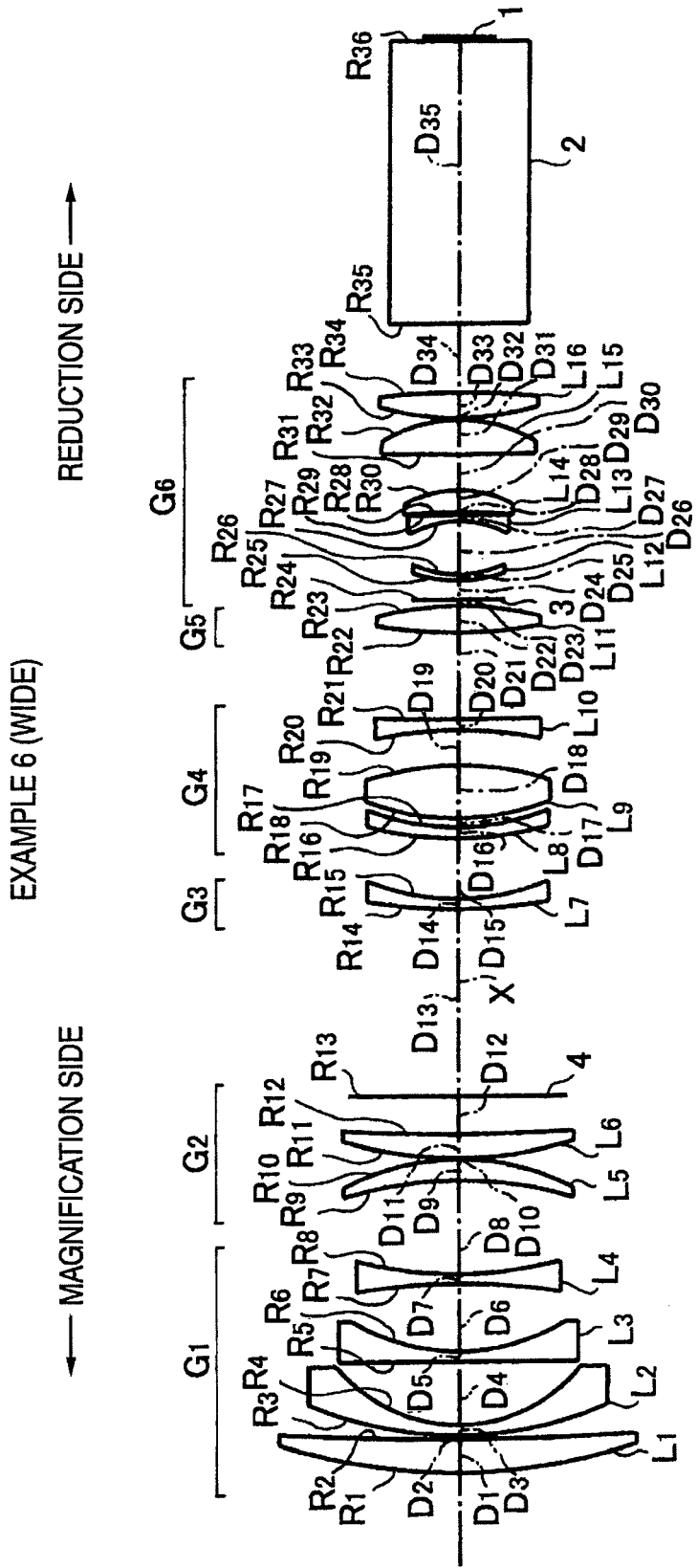
FIG. 11 is a diagram showing the lens configuration of a projection zoom lens according to Example 6.
Figure 12:
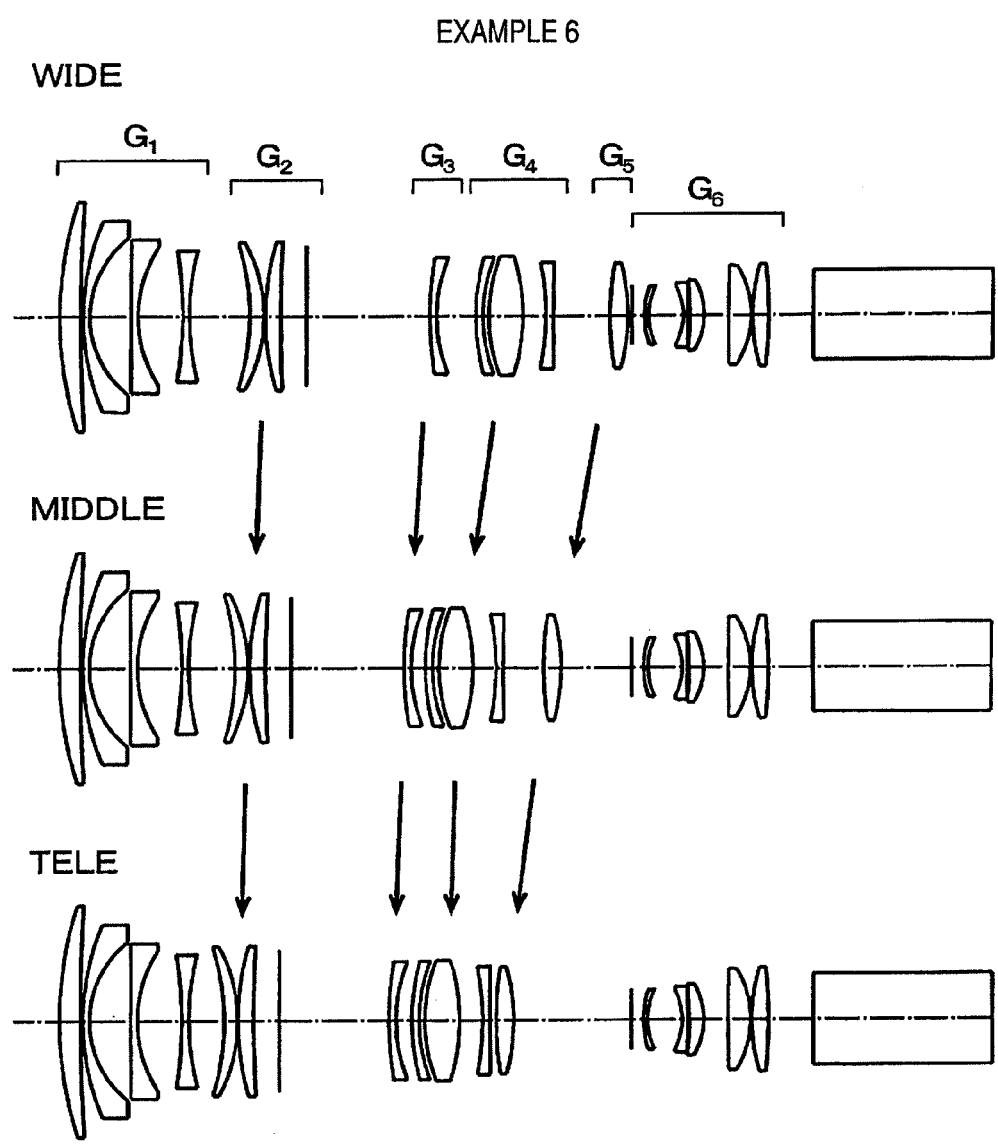
FIG. 12 is a diagram showing movement positions of lens groups of the projection zoom lens according to Example 6 at a wide-angle end (WIDE), a middle position (MIDDLE), and a telephoto end (TELE).

The schematic configuration of a projection zoom lens according to Example 6 is shown in FIGS. 11 and 12. FIG. 11 is a diagram showing the lens configuration at a wide-angle end of a projection zoom lens according to Example 6. FIG. 12 shows movement positions of lens groups at a wide-angle end (WIDE), a middle position (MIDDLE), and a telephoto end (TELE) according to a power-varying operation in a projection zoom lens according to Example 6.

As shown in FIG. 11, the projection zoom lens according to Example 6 basically has a configuration similar to that of Example 1.

The upper part of Table 6 shows a focal length f from the wide-angle end to the telephoto end of the entire system in Example 6, a back focal length Bf (air conversion distance), and Fno.

The middle part of Table 6 show a curvature radius R of each lens surface, a center thickness of each lens, an air spacing D between lenses, and a refractive index Nd and an Abbe number νd of each lens at the d-line.

The lower part of Table 6 shows a distance $D_8$ (variable 1) between the first lens group $G_1$ and the second lens group $G_2$, a distance $D_{13}$ (variable 2) between the second lens group $G_2$ and the third lens group $G_3$, a distance $D_{15}$ (variable 3) between the third lens group $G_3$ and the fourth lens group $G_4$, a distance $D_{21}$ (variable 4) between the fourth lens group $G_4$ and the fifth lens group $G_5$, and a distance $D_{23}$ (variable 5) between the fifth lens group $G_5$ and the sixth lens group $G_6$ at the wide-angle end (WIDE: zoom ratio 1.000), the middle position (MIDDLE: zoom ratio 1.286), and the telephoto end (TELE: zoom ratio 1.520).

TABLE 6 f = 1.000~1.520, Bf = 2.98, Fno. = 2.50

| Surface Number | R | D | Nd | vd |
|---|---|---|---|---|
| 1 | 6.7217 | 0.3796 | 1.77250 | 49.6 |
| 2 | 34.2067 | 0.0449 | | |
| 3 | 4.4058 | 0.1197 | 1.49700 | 81.5 |
| 4 | 1.8186 | 0.7349 | | |
| 5 | ∞ | 0.1197 | 1.49700 | 81.5 |
| 6 | 2.3664 | 0.7890 | | |
| 7 | −7.3947 | 0.1122 | 1.80100 | 35.0 |
| 8 | 4.6173 | Variable 1 | | |
| 9 | −4.6149 | 0.2457 | 1.75520 | 27.5 |
| 10 | −2.8310 | 0.0150 | | |
| 11 | 4.6236 | 0.2728 | 1.83400 | 37.2 |
| 12 | 22.2538 | 0.4489 | | |
| 13 Stop | ∞ | Variable 2 | | |
| 14 | 6.1535 | 0.1235 | 1.80518 | 25.4 |
| 15 | 2.6938 | Variable 3 | | |
| 16 | 3.9458 | 0.1309 | 1.60342 | 38.0 |
| 17 | 2.7735 | 0.1122 | | |
| 18 | 2.9342 | 0.6213 | 1.58144 | 40.7 |
| 19 | −3.4719 | 0.4185 | | |
| 20 | −4.7544 | 0.1309 | 1.80610 | 40.9 |
| 21 | 44.3442 | Variable 4 | | |
| 22 | 5.5368 | 0.3202 | 1.49700 | 81.5 |
| 23 | −3.6091 | Variable 5 | | |
| 24 Diaphragm | ∞ | 0.2221 | | |
| 25 | 1.6040 | 0.0748 | 1.51633 | 64.1 |
| 26 | 1.2189 | 0.6153 | | |
| 27 | −1.1452 | 0.0767 | 1.83481 | 42.7 |
| 28 | ∞ | 0.0374 | | |
| 29 | −6.8192 | 0.2529 | 1.49700 | 81.5 |
| 30 | −1.2873 | 0.4203 | | |
| 31 | 39.6843 | 0.4077 | 1.49700 | 81.5 |
| 32 | −1.7246 | 0.0150 | | |
| 33 | 3.2280 | 0.2940 | 1.49700 | 81.5 |
| 34 | −9.2335 | 0.8013 | | |
| 35 | ∞ | 3.3000 | 1.51633 | 64.1 |
| 36 | ∞ | | | |

| Zoom Ratio | Variable 1 | Variable 2 | Variable 3 | Variable 4 | Variable 5 |
|---|---|---|---|---|---|
| 1.000 (WIDE) | 1.0818 | 2.2007 | 0.7063 | 1.0202 | 0.0748 |
| 1.286 (MIDDLE) | 0.8274 | 2.0006 | 0.2649 | 0.7318 | 1.2591 |
| 1.520 (TELE) | 0.6241 | 1.9313 | 0.2908 | 0.1108 | 2.1268 |

Table 9 shows numerical values corresponding to the conditional expressions (1) to (9) in Example 6.

Figure 22:
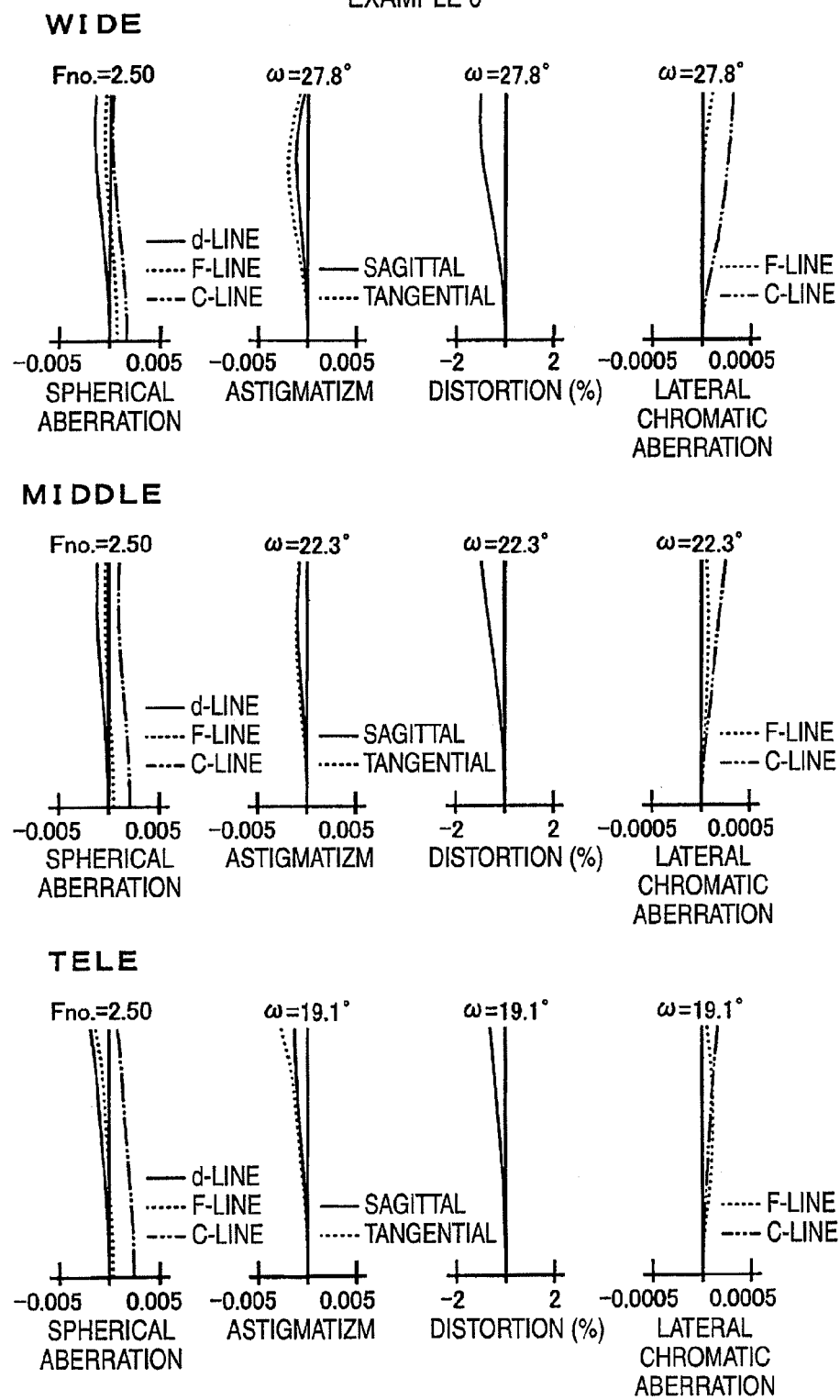
FIG. 22 is aberration diagrams of the projection zoom lens according to Example 6.

FIG. 22 is aberration diagrams showing aberrations (spherical aberration, astigmatism, distortion, and lateral chromatic aberration) at the wide-angle end (WIDE), the middle position (MIDDLE), and the telephoto end (TELE) of the projection zoom lens according to Example 6.

As will be apparent from FIG. 22 and Table 6, according to the projection zoom lens of Example 6, aberrations can be satisfactorily corrected over the whole zoom region. Thus, a proper back focal length and satisfactory telecentricity on the reduction side can be achieved, and performance such as brightness, compactness, a wide angle of view, and a large zoom ratio can be exhibited with the best balance. In particular, Fno. is 2.50 over the whole zoom region, so that brightness can be maintained constant.

While a half angle of view at the wide-angle end is wide as 27.8°, the zoom ratio is set large as 1.520. Thus, the zoom lens is suitable for a movie theater having a comparatively short projection distance, and it is possible to cope with wide changes in the projection distance.

Example 7

Figure 13:
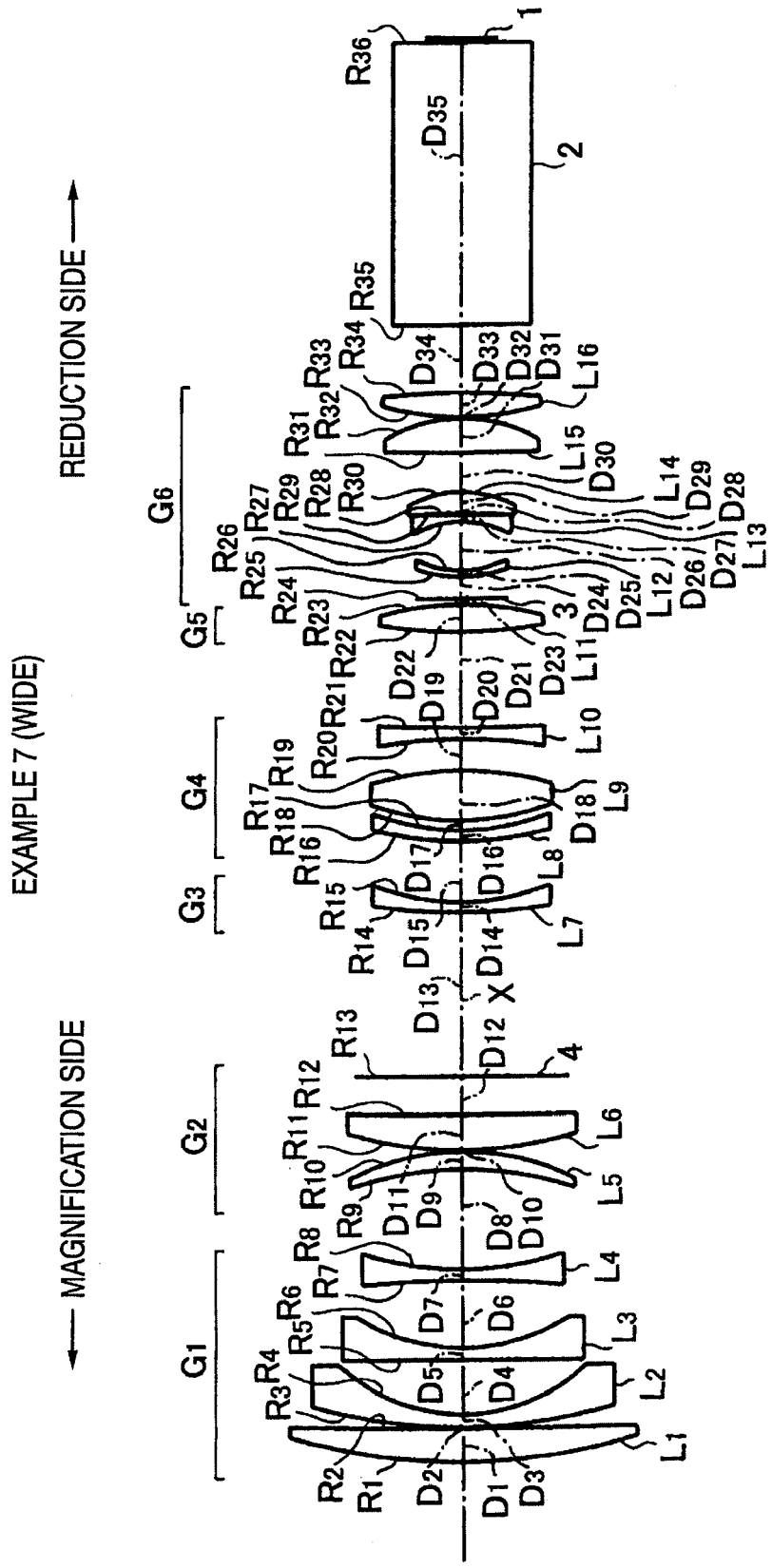
FIG. 13 is a diagram showing the lens configuration of a projection zoom lens according to Example 7.
Figure 14:
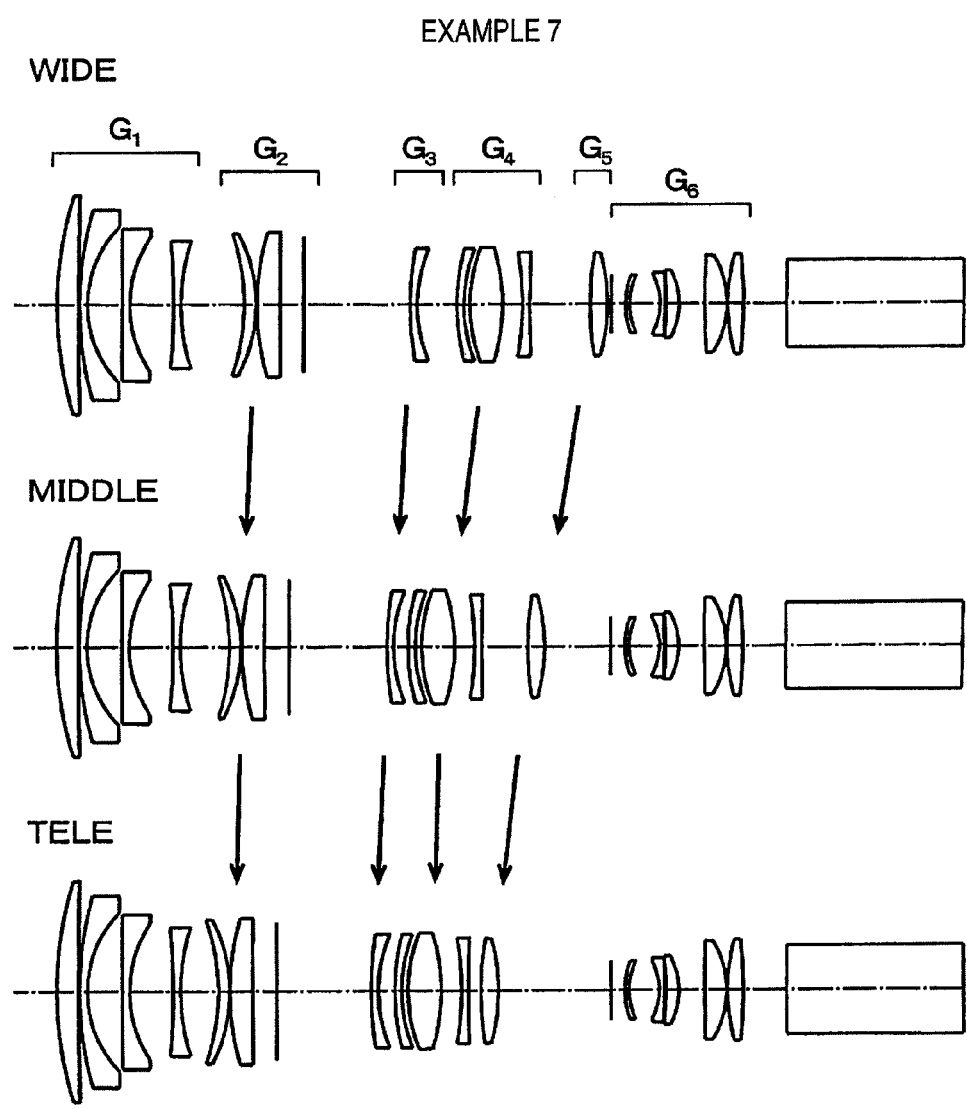
FIG. 14 is a diagram showing movement positions of lens groups of the projection zoom lens according to Example 7 at a wide-angle end (WIDE), a middle position (MIDDLE), and a telephoto end (TELE).

The schematic configuration of a projection zoom lens according to Example 7 is shown in FIGS. 13 and 14. FIG. 13 is a diagram showing the lens configuration at a wide-angle end of a projection zoom lens according to Example 7. FIG. 14 shows movement positions of lens groups at a wide-angle end (WIDE), a middle position (MIDDLE), and a telephoto end (TELE) according to a power-varying operation in a projection zoom lens according to Example 7.

As shown in FIG. 13, the projection zoom lens according to Example 7 basically has a configuration similar to that of Example 1.

The upper part of Table 7 shows a focal length f from the wide-angle end to the telephoto end of the entire system in Example 7, a back focal length Bf (air conversion distance), and Fno.

The middle part of Table 7 show a curvature radius R of each lens surface, a center thickness of each lens, an air spacing D between lenses, and a refractive index Nd and an Abbe number vd of each lens at the d-line.

The lower part of Table 7 shows a distance $D_8$ (variable 1) between the first lens group $G_1$ and the second lens group $G_2$, a distance $D_{13}$ (variable 2) between the second lens group $G_2$ and the third lens group $G_3$, a distance $D_{15}$ (variable 3) between the third lens group $G_3$ and the fourth lens group $G_4$, a distance $D_{21}$ (variable 4) between the fourth lens group $G_4$ and the fifth lens group $G_5$, and a distance $D_{23}$ (variable 5) between the fifth lens group $G_5$ and the sixth lens group $G_6$ at the wide-angle end (WIDE: zoom ratio 1.000), the middle position (MIDDLE: zoom ratio 1.286), and the telephoto end (TELE: zoom ratio 1.520).

TABLE 7 f = 1.000~1.520, Bf = 2.97, Fno. = 2.50

| Surface Number | R | D | Nd | vd |
|---|---|---|---|---|
| 1 | 6.9622 | 0.3899 | 1.77250 | 49.6 |
| 2 | 86.0281 | 0.0186 | | |
| 3 | 6.3118 | 0.1490 | 1.49700 | 81.5 |
| 4 | 2.0751 | 0.6377 | | |
| 5 | ∞ | 0.1378 | 1.49700 | 81.5 |
| 6 | 2.2865 | 0.7952 | | |
| 7 | −12.6746 | 0.1304 | 1.83400 | 37.2 |
| 8 | 3.7446 | Variable 1 | | |
| 9 | −4.0701 | 0.2158 | 1.75520 | 27.5 |
| 10 | −2.8123 | 0.0149 | | |
| 11 | 4.6075 | 0.4112 | 1.83400 | 37.2 |
| 12 | 77.5910 | 0.4469 | | |
| 13 Stop | ∞ | Variable 2 | | |
| 14 | 6.4311 | 0.1229 | 1.80518 | 25.4 |
| 15 | 2.6368 | Variable 3 | | |
| 16 | 4.0262 | 0.1304 | 1.60342 | 38.0 |
| 17 | 2.8163 | 0.1117 | | |
| 18 | 2.9599 | 0.5979 | 1.58144 | 40.7 |
| 19 | −3.6242 | 0.3712 | | |
| 20 | −5.6863 | 0.1304 | 1.80610 | 40.9 |
| 21 | 23.4051 | Variable 4 | | |
| 22 | 5.4686 | 0.3226 | 1.49700 | 81.5 |
| 23 | −3.5390 | Variable 5 | | |
| 24 Diaphragm | ∞ | 0.2576 | | |
| 25 | 1.5591 | 0.0745 | 1.51633 | 64.1 |
| 26 | 1.1978 | 0.5675 | | |
| 27 | −1.1439 | 0.0764 | 1.83481 | 42.7 |
| 28 | ∞ | 0.0298 | | |
| 29 | −6.7961 | 0.2478 | 1.49700 | 81.5 |
| 30 | −1.2781 | 0.4635 | | |

TABLE 7-continued f = 1.000~1.520, Bf = 2.97, Fno. = 2.50

| | | | | |
|---|---|---|---|---|
| 31 | 37.9200 | 0.4044 | 1.49700 | 81.5 |
| 32 | −1.7334 | 0.0149 | | |
| 33 | 3.3147 | 0.2828 | 1.49700 | 81.5 |
| 34 | −8.9247 | 0.7913 | | |
| 35 | ∞ | 3.3000 | 1.51633 | 64.1 |
| 36 | ∞ | | | |

| Zoom Ratio | Variable 1 | Variable 2 | Variable 3 | Variable 4 | Variable 5 |
|---|---|---|---|---|---|
| 1.000 (WIDE) | 1.1584 | 1.9351 | 0.7215 | 1.1379 | 0.0774 |
| 1.286 (MIDDLE) | 0.8968 | 1.7809 | 0.2642 | 0.8466 | 1.2417 |
| 1.520 (TELE) | 0.6733 | 1.7202 | 0.3056 | 0.2215 | 2.1097 |

Table 9 shows numerical values corresponding to the conditional expressions (1) to (9) in Example 7.

FIG. 23 is aberration diagrams showing aberrations (spherical aberration, astigmatism, distortion, and lateral chromatic aberration) at the wide-angle end (WIDE), the middle position (MIDDLE), and the telephoto end (TELE) of the projection zoom lens according to Example 7.

As will be apparent from FIG. 23 and Table 7, according to the projection zoom lens of Example 7, aberrations can be satisfactorily corrected over the whole zoom region. Thus, a proper back focal length and satisfactory telecentricity on the reduction side can be achieved, and performance such as brightness, compactness, a wide angle of view, and a large zoom ratio can be exhibited with the best balance. In particular, Fno. is 2.50 over the whole zoom region, so that brightness can be maintained constant.

While a half angle of view at the wide-angle end is wide as 27.7°, the zoom ratio is set large as 1.520. Thus, the zoom lens is suitable for a movie theater having a comparatively short projection distance, and it is possible to cope with wide changes in the projection distance.

Example 8

Figure 15:
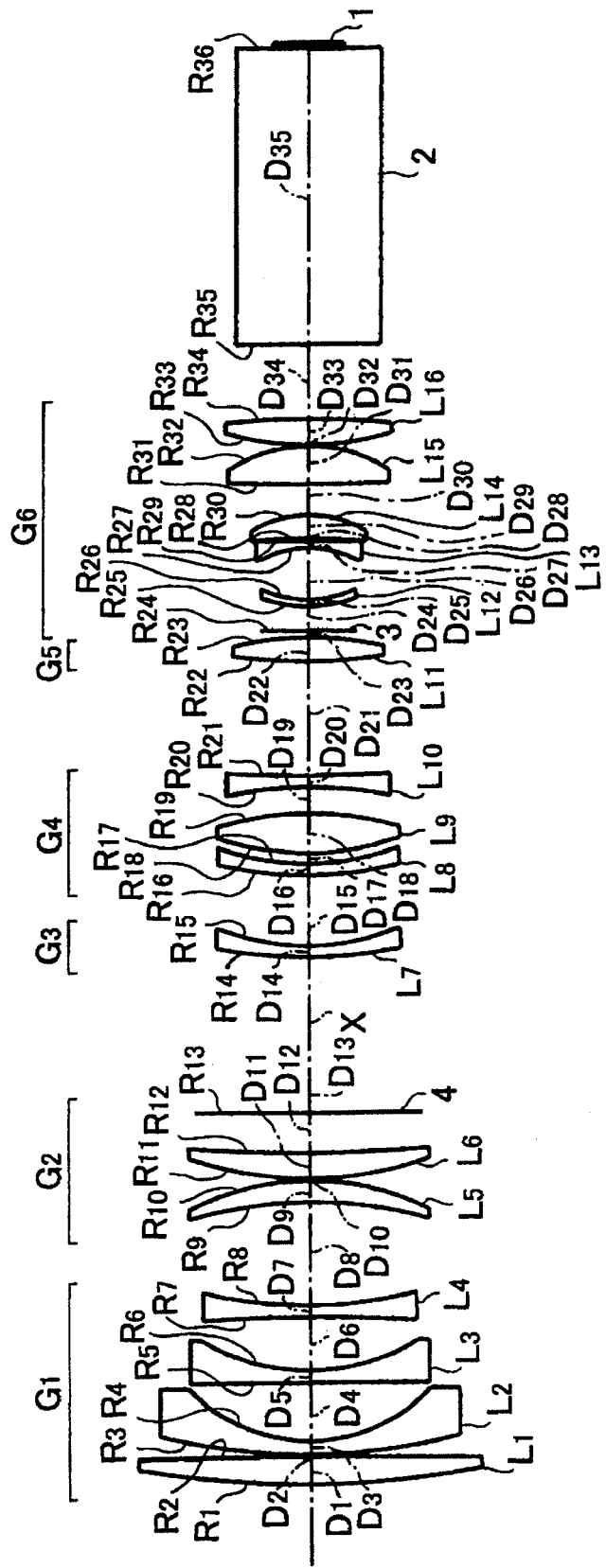
FIG. 15 is a diagram showing the lens configuration of a projection zoom lens according to Example 8.

The schematic configuration of a projection zoom lens according to Example 8 is shown in FIGS. 15 and 16. FIG. 15 is a diagram showing the lens configuration at a wide-angle end of a projection zoom lens according to Example 8. FIG. 16 shows movement positions of lens groups at a wide-angle end (WIDE), a middle position (MIDDLE), and a telephoto end (TELE) according to a power-varying operation in a projection zoom lens according to Example 8.

As shown in FIG. 15, the projection zoom lens according to Example 8 basically has a configuration similar to that of Example 1, but is different in that the first lens $L_1$ in the first lens group $G_1$ has a biconvex lens.

The upper part of Table 8 shows a focal length f from the wide-angle end to the telephoto end of the entire system in Example 8, a back focal length Bf (air conversion distance), and Fno.

The middle part of Table 8 show a curvature radius R of each lens surface, a center thickness of each lens, an air spacing D between lenses, and a refractive index Nd and an Abbe number vd of each lens at the d-line.

The lower part of Table 8 shows a distance $D_8$ (variable 1) between the first lens group $G_1$ and the second lens group $G_2$, a distance $D_{13}$ (variable 2) between the second lens group $G_2$ and the third lens group $G_3$, a distance $D_{15}$ (variable 3) between the third lens group $G_3$ and the fourth lens group $G_4$, a distance $D_{21}$ (variable 4) between the fourth lens group $G_4$ and the fifth lens group $G_5$, and a distance $D_{23}$ (variable 5) between the fifth lens group $G_5$ and the sixth lens group $G_6$ at the wide-angle end (WIDE: zoom ratio 1.000), the middle position (MIDDLE: zoom ratio 1.224), and the telephoto end (TELE: zoom ratio 1.400).

TABLE 8 f = 1.000~1.400, Bf = 3.00, Fno. = 2.50

| Surface Number | R | D | Nd | vd |
|---|---|---|---|---|
| 1 | 10.1902 | 0.3085 | 1.77250 | 49.6 |
| 2 | −118.3085 | 0.0188 | | |
| 3 | 6.6187 | 0.1507 | 1.49700 | 81.5 |
| 4 | 1.8505 | 0.6455 | | |
| 5 | ∞ | 0.1394 | 1.49700 | 81.5 |
| 6 | 2.3080 | 0.6018 | | |
| 7 | −18.5423 | 0.1318 | 1.83400 | 37.2 |
| 8 | 4.8420 | Variable 1 | | |
| 9 | −4.7887 | 0.2438 | 1.75520 | 27.5 |
| 10 | −2.9143 | 0.0151 | | |
| 11 | 3.9788 | 0.2891 | 1.83400 | 37.2 |
| 12 | 14.4582 | 0.4520 | | |
| 13 Stop | ∞ | Variable 2 | | |
| 14 | 5.3867 | 0.1243 | 1.80518 | 25.4 |
| 15 | 2.5616 | Variable 3 | | |
| 16 | 4.1404 | 0.1318 | 1.60342 | 38.0 |
| 17 | 2.8642 | 0.1204 | | |
| 18 | 3.0638 | 0.4469 | 1.61340 | 44.3 |
| 19 | −3.5268 | 0.2931 | | |
| 20 | −4.6116 | 0.1318 | 1.80610 | 40.9 |
| 21 | 16.6291 | Variable 4 | | |
| 22 | 5.7971 | 0.2746 | 1.49700 | 81.5 |
| 23 | −3.5541 | Variable 5 | | |
| 24 Diaphragm | ∞ | 0.2725 | | |
| 25 | 1.5278 | 0.0753 | 1.51633 | 64.1 |
| 26 | 1.1572 | 0.5843 | | |
| 27 | −1.0896 | 0.0772 | 1.83481 | 42.7 |
| 28 | ∞ | 0.0301 | | |
| 29 | −6.8175 | 0.2651 | 1.49700 | 81.5 |
| 30 | −1.2312 | 0.3488 | | |
| 31 | 27.0398 | 0.4251 | 1.49700 | 81.5 |
| 32 | −1.6431 | 0.0151 | | |
| 33 | 3.2729 | 0.2943 | 1.48749 | 70.2 |
| 34 | −8.6815 | 0.8212 | | |
| 35 | ∞ | 3.3000 | 1.51633 | 64.1 |
| 36 | ∞ | | | |

| Zoom Ratio | Variable 1 | Variable 2 | Variable 3 | Variable 4 | Variable 5 |
|---|---|---|---|---|---|
| 1.000 (WIDE) | 1.1461 | 1.7492 | 0.8038 | 1.2880 | 0.0790 |
| 1.224 (MIDDLE) | 0.9502 | 1.5849 | 0.3544 | 1.1341 | 1.0427 |
| 1.400 (TELE) | 0.7876 | 1.5439 | 0.3703 | 0.6232 | 1.7413 |

Table 9 shows numerical values corresponding to the conditional expressions (1) to (9) in Example 8.

FIG. 24 is aberration diagrams showing aberrations (spherical aberration, astigmatism, distortion, and lateral chromatic aberration) at the wide-angle end (WIDE), the middle position (MIDDLE), and the telephoto end (TELE) of the projection zoom lens according to Example 8.

As will be apparent from FIG. 24 and Table 8, according to the projection zoom lens of Example 8, aberrations can be satisfactorily corrected over the whole zoom region. Thus, a proper back focal length and satisfactory telecentricity on the reduction side can be achieved, and performance such as brightness, compactness, a wide angle of view, and a large zoom ratio can be exhibited with the best balance. In particular, Fno. is 2.50 over the whole zoom region, so that brightness can be maintained constant.

While a half angle of view at the wide-angle end is wide as 28.0°, the zoom ratio is set large as 1.400. Thus, the zoom lens is suitable for a movie theater having a comparatively short projection distance, and it is possible to cope with wide changes in the projection distance.

TABLE 9

|  | Example 1 | Example 2 | Example 3 | Example 4 | Example 5 | Example 6 | Example 7 | Example 8 |
|---|---|---|---|---|---|---|---|---|
| Conditional Expression (1) | 2.99 | 2.99 | 2.76 | 3.00 | 2.98 | 2.98 | 2.97 | 3.00 |
| Conditional Expression (2) | 3.87 | 3.68 | 3.62 | 4.04 | 3.83 | 3.89 | 3.79 | 3.77 |
| Conditional Expression (3) | 81.5 | 81.5 | 81.5 | 81.5 | 81.5 | 81.5 | 81.5 | 81.5 |
| Conditional Expression (4) | 81.5 | 81.5 | 81.5 | 81.5 | 81.5 | 81.5 | 81.5 | 81.5 |
| Conditional Expression (5) | 42.7 | 42.7 | 42.7 | 42.7 | 42.7 | 42.7 | 42.7 | 42.7 |
| Conditional Expression (6) | 1.83 | 1.83 | 1.83 | 1.83 | 1.83 | 1.83 | 1.83 | 1.83 |
| Conditional Expression (7) | 2.91 | 2.77 | 2.69 | 2.93 | 2.95 | 2.86 | 2.89 | 2.81 |
| Conditional Expression (8) | 2.44 | 2.37 | 2.26 | 2.45 | 2.49 | 2.42 | 2.42 | 2.39 |
| Conditional Expression (9) | 4.41 | 4.74 | 4.44 | 3.56 | 3.50 | 4.68 | 4.44 | 4.34 |

What is claimed is:

1. A projection zoom lens comprising, in order from a magnification side:
    a first lens group having negative refractive power adapted to perform focusing with being fixed during power-varying;
    a second lens group having positive refractive power adapted to move during power-varying;
    a third lens group having negative refractive power adapted to move during power-varying;
    a fourth lens group having positive refractive power adapted to move during power-varying;
    a fifth lens group having positive refractive power adapted to move during power-varying; and
    a sixth lens group having positive refractive power adapted to be fixed during power-varying and to include a first stop nearest to the magnification side,
    wherein a numerical aperture is set constant over the whole region of power-varying,
    each lens included in the first to sixth groups is a single lens,
    a reduction side is made telecentric, and
    the following conditional expression (1) is satisfied:

$$2.5 < Bf/f \quad (1)$$

where Bf denotes an air-converted back focal length of the entire system, and
    f denotes a focal length at a wide-angle end of the entire system.

2. The projection zoom lens according to claim 1, wherein the second lens group comprises:
    a lens nearest to the magnification side is a positive meniscus lens having a concave surface directed toward the magnification side; and
    a lens nearest to a reduction side is a positive lens where a surface thereof on the magnification side is a convex surface having a curvature larger than that of a surface thereof on the reduction side, and
    wherein the following conditional expression (2) is satisfied:

$$3.5 < f2/f < 4.2 \quad (2)$$

where f2 denotes a focal length of the second lens group.

3. The projection zoom lens according to claim 1, wherein all lenses in the second lens group are positive lenses.

4. The projection zoom lens according to claim 1, wherein the second lens group has a second stop arranged nearest to the reduction side.

5. The projection zoom lens according to claim 1, wherein the fifth lens group consists of one biconvex lens, and
    the following conditional expression (3) is satisfied:

$$70 < vd_{G5} \quad (3)$$

where $vd_{G5}$ denotes an Abbe number of the biconvex lens in the fifth lens group at the d-line.

6. The projection zoom lens according to claim 1, wherein the sixth lens group includes, in order from the magnification side:
    a negative meniscus lens having a convex surface directed toward the magnification side;
    a negative lens having a concave surface directed toward the magnification side;
    a positive lens having a convex surface directed toward the reduction side; and
    at least one positive lens, and
    wherein the following conditional expression (4) is satisfied:

$$65 < vd_{G6p} \quad (4)$$

where $vd_{G6p}$ denotes an Abbe number of each positive lens in the sixth lens group at the d-line.

7. The projection zoom lens according to claim 6, wherein the following conditional expressions (5) and (6) are satisfied:

$$40 < vd_{G6n} \quad (5)$$

$$1.8 < Nd_{G6n} \quad (6)$$

where $vd_{G6n}$ denotes an Abbe number of the negative lens having the concave surface directed toward the magnification side in the sixth lens group at the d-line, and
    $Nd_{G6n}$ denotes a refractive index of the negative lens having the concave surface directed toward the magnification side in the sixth lens group at the d-line.

8. The projection zoom lens according to claim 6, wherein the following conditional expression (7) is satisfied:

$$2.5 < f6/f < 3.0 \quad (7)$$

where f6 denotes a focal length of the sixth lens group.

9. The projection zoom lens according to claim 6, wherein the following conditional expression (8) is satisfied:

$$2.1 < D_{G6}/f < 2.6 \tag{8}$$

where $D_{G6}$ denotes a distance from the first stop of the sixth lens group to a lens surface of the sixth lens group nearest to the reduction side.

10. The projection zoom lens according to claim 6, wherein the following conditional expression (9) is satisfied:

$$3.3 < |f6/f6_F| < 5.0 \tag{9}$$

where $f6_F$ denotes a distance from a lens surface of the sixth lens group nearest to the magnification side to a magnification-side focal point of the sixth lens group, and f6 denotes a focal length of the sixth lens group.

11. A projection-type display device comprising:

a light source;

a light valve; and the projection zoom lens according to claim 1 serving as a projection lens projecting an optical image based on light modulated by the light valve onto a screen.

* * * * *